US012590690B2

(12) United States Patent
Emerick

(10) Patent No.: US 12,590,690 B2

(45) Date of Patent: Mar. 31, 2026

(54) LIGHTING FIXTURE

(71) Applicant: ABL IP Holding, LLC, Atlanta, GA (US)

(72) Inventor: Matthew Emerick, Decatur, GA (US)

(73) Assignee: ABL IP Holding, LLC, Atlanta, GA (US)

(*) Notice: Subject to any disclaimer, the term of this patent is extended or adjusted under 35 U.S.C. 154(b) by 39 days.

(21) Appl. No.: 18/595,572

(22) Filed: Mar. 5, 2024

(65) Prior Publication Data

US 2024/0302028 A1 Sep. 12, 2024

Related U.S. Application Data

(60) Provisional application No. 63/488,634, filed on Mar. 6, 2023.

(51) Int. Cl.
*F21V 15/00* (2015.01)
*F21V 21/04* (2006.01)

(52) U.S. Cl.
CPC ............ *F21V 15/005* (2013.01); *F21V 21/04* (2013.01)

(58) Field of Classification Search
CPC ............................... F21V 21/04; F21V 15/005
See application file for complete search history.

(56) References Cited

U.S. PATENT DOCUMENTS 2,744,716 A * 5/1956 Zingone .................. F21V 21/00 362/147
5,251,118 A 10/1993 Budnovitch et al.
5,345,729 A * 9/1994 Prahst ..................... F21V 21/04 52/28
6,511,213 B1 1/2003 Maley, Sr.
7,322,722 B2 1/2008 Hartmann, Jr. et al.
8,337,055 B2 12/2012 Clifton et al.
10,060,601 B2 8/2018 Donnini
11,047,538 B2 6/2021 Danesh et al.
11,163,104 B2 11/2021 Yeo et al.
11,168,878 B2 11/2021 Cordero et al.
11,287,104 B2 * 3/2022 Stolte ...................... F21S 8/026
2005/0248950 A1 * 11/2005 McCarthy, III ........... F21V 3/02 362/147
2008/0137347 A1 6/2008 Trott et al.
2008/0192489 A1 8/2008 Ward
2011/0110107 A1 5/2011 Kawato (Continued)

FOREIGN PATENT DOCUMENTS

CN 206600639 U 10/2017
CN 217482570 U 9/2022

(Continued)

OTHER PUBLICATIONS

Innovation Q+ NPL search (Year: 2024).*

*Primary Examiner* — Anabel Ton

(74) *Attorney, Agent, or Firm* — Grossman, Tucker, Perreault & Pfleger, PLLC

(57) ABSTRACT

A vandal resistant light may include a housing having a first end and a second end, the first end opposite the second end, a lighting assembly disposed at the first end of the housing, a cover disposed at the second end of the housing, the cover includes a continuous uninterrupted groove, and a flange including an extension configured to be at least partially received within the continuous uninterrupted groove.

22 Claims, 19 Drawing Sheets

(56) References Cited

U.S. PATENT DOCUMENTS

| | | | |
|---|---|---|---|
| 2011/0267834 A1 | 11/2011 | Potucek et al. |
| 2013/0010476 A1 | 1/2013 | Pickard et al. |
| 2013/0286646 A1 | 10/2013 | Snell |
| 2014/0049957 A1 | 2/2014 | Goelz et al. |
| 2016/0334079 A1 | 11/2016 | Donnini |
| 2018/0320840 A1 | 11/2018 | Machlis et al. |

FOREIGN PATENT DOCUMENTS

| | | | |
|---|---|---|---|
| JP | 2595974 | Y2 | 6/1999 |
| JP | 06050158 | U | 2/2006 |
| JP | 2013069586 | A | 4/2013 |
| JP | 5495092 | B2 | 5/2014 |
| JP | 5732611 | B2 | 6/2015 |
| JP | 6555916 | B2 | 8/2019 |
| KR | 100882592 | B1 | 2/2009 |

* cited by examiner

LIGHTING FIXTURE

CROSS-REFERENCE TO RELATED APPLICATIONS

The present application claims the benefit of U.S. Provisional Application Ser. No. 63/488,634, entitled Lighting Fixture, filed on Mar. 6, 2023, which is fully incorporated herein by reference.

TECHNICAL FIELD

The present disclosure is generally directed to lighting fixtures and more specifically to vandal resistant lighting fixtures.

BACKGROUND INFORMATION

Building lighting systems may include a variety of lighting fixtures including ceiling fixtures, wall fixtures, free-standing fixtures, and/or any other type of lighting fixture. Lighting fixtures within detainment facilities (e.g., prisons), behavioral health facilities, isolation areas, and/or unmonitored public or private spaces (e.g., stairwells or locker rooms) may be subjected to vandalism and/or misuse. For example, lighting fixtures may be used to hide contraband and/or for self-harm. More specifically, one or more gaps may be present between components of a lighting fixture. These gaps may allow a detainee to wedge an item within the gap (e.g., providing a hiding place and/or a ligature point).

An example lighting fixture may be a recessed lighting fixture. The recessed lighting fixture may include a lighting assembly, a housing extending from the lighting assembly, and a flange configured to couple to the housing, wherein the flange and the lighting assembly are at opposite ends of the housing. An at least partially transparent cover is disposed between the housing and the flange such that flange secures the cover to the housing. As may be appreciated, an interface between the flange and the cover may represent a ligature point if an individual is able to wedge an object between the flange and the cover. In other words, if a gap is present or can be forcibly formed at the interface, the interface may represent a ligature point.

BRIEF DESCRIPTION OF THE DRAWINGS

These and other features and advantages will be better understood by reading the following detailed description, taken together with the drawings, wherein.

DETAILED DESCRIPTION

The present disclosure is generally directed to a vandal resistant light. The vandal resistant light includes a housing having a first end and a second end, the first end being opposite the second end. A lighting assembly is disposed at the first end. A flange and a cover are disposed at the second end. The cover includes a groove for receiving an extension of the flange, creating a tortuous path. The tortuous path may impede and/or prevent the insertion of an object between the flange and the cover.

Figure 1:
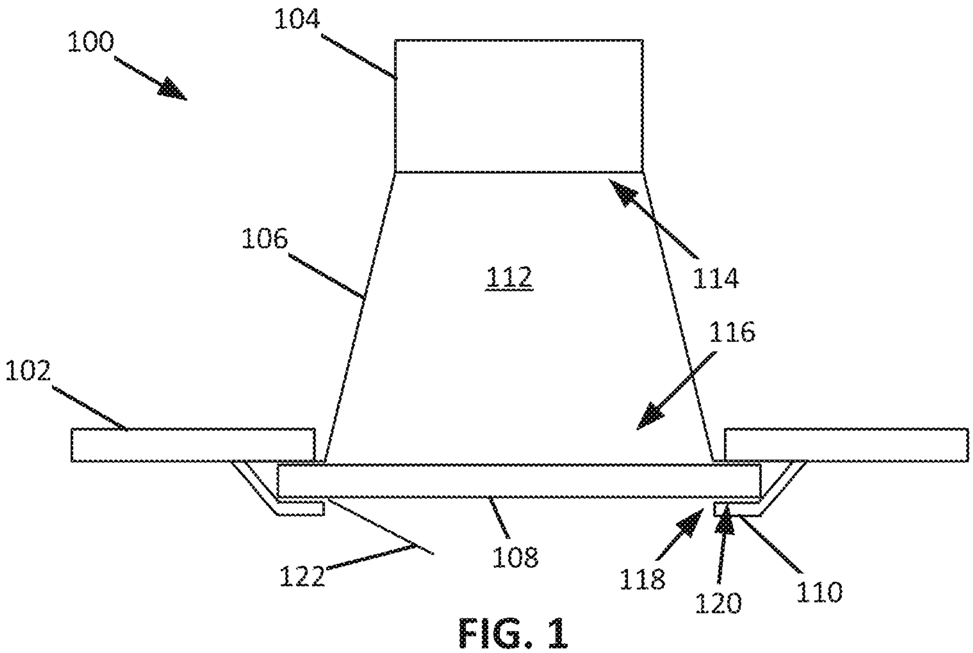
FIG. 1 is a schematic cross-sectional view of a recessed light, consistent with embodiments of the present disclosure.

FIG. 1 is a schematic cross-sectional view of an example of a recessed light 100 disposed within a ceiling 102. As shown, the recessed light 100 includes a lighting assembly 104, a housing 106, an at least partially transparent housing cover 108, and a flange 110. As shown, the housing 106 defines a lighting cavity 112 having a first open end 114 and a second open end 116. The lighting assembly 104 is coupled to the housing 106 at the first open end 114 such that the lighting assembly 104 emits light into the lighting cavity 112. The housing cover 108 and the flange 110 are coupled to the housing 106 at the second open end 116 such that light within the light cavity 112 passes through the housing cover 108 and into a surrounding environment.

As shown, the housing cover 108 is disposed between the housing 106 and the flange 110 such that an interface 118 is formed therebetween. A gap 120 may be present at the interface 118 and/or be formed as a result of an individual tampering with one or more of the flange 110 and/or the housing cover 108. The individual may insert an object 122 into the use the gap 120, creating a ligature point (e.g., for self-harm) and/or damaging the recessed light 100 (e.g., to access internal components and/or to create another hazard).

Figure 2:
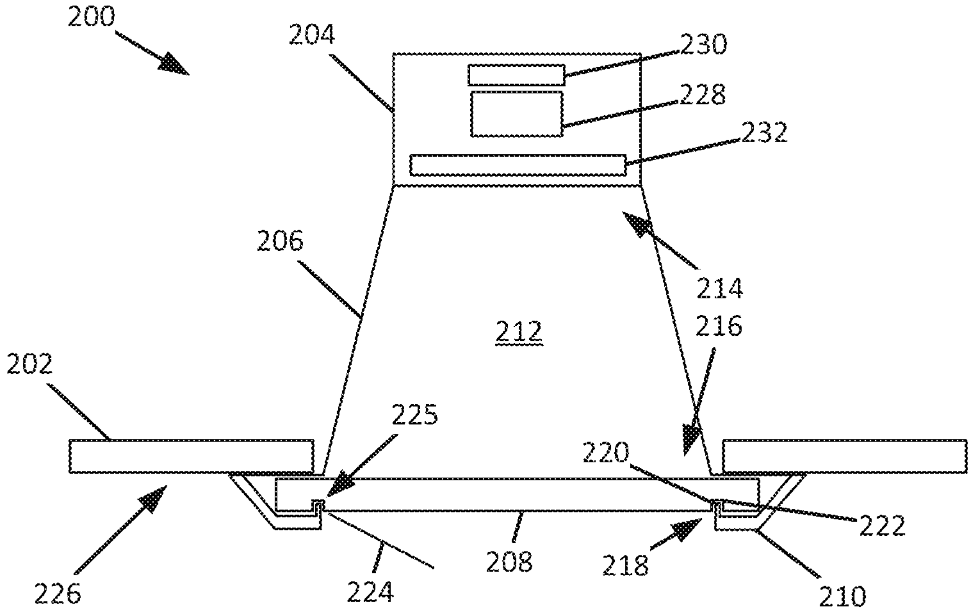
FIG. 2 is a schematic cross-sectional view of a vandal resistant recessed light, consistent with embodiments of the present disclosure.

FIG. 2 is a schematic cross-sectional view of an example of a vandal resistant light 200 (e.g., a recessed light) disposed within a ceiling 202. The vandal resistant light 200 is configured to, for example, mitigate a ligature risk, when compared to the recessed light 100 of FIG. 1.

The vandal resistant light 200 includes a lighting assembly 204, a housing 206 (e.g., a reflector cone), an at least partially transparent housing cover 208, and a flange 210. As shown, the housing 206 defines a lighting cavity 212 having a first open end 214 and a second open end 216. The lighting assembly 204 is coupled to the housing 206 at the first open end 214 such that the lighting assembly 204 emits light into the lighting cavity 212. The housing cover 208 and the flange 210 are coupled to the housing 206 at the second open end 216 such that light within the light cavity 212 passes through the housing cover 208 and into a surrounding environment. The housing 206 may be cylindrical, conical, rectangular (e.g., a square), triangular, and/or any other shape. As such, a cross-section of the housing 206 taken at the second open end 216 may be circular (e.g., for a cylindrical or conical housing 206), rectangular (e.g., square), triangular, and/or any other shape. For a housing 206 having a circular cross-section at the second open end 216 (e.g., a cylindrical or conical housing 206), the second open end 216 may have, for example, a 4 inch (or 10.16 centimeter) diameter or a 6 inch (15.24 centimeter) diameter. The housing cover 208 and/or the flange 210 may have a shape that generally corresponds to a cross-sectional shape of the hosing 206. For example, the housing cover 208 may be circular (e.g., for a cylindrical or conical housing 206), rectangular (e.g., square), triangular, and/or any other shape and/or the flange 210 may be annular (e.g., for a cylindrical or conical housing 206), an open rectangular shape (e.g., an open square), an open triangular shape, and/or any other open shape.

As shown, the housing cover 208 is disposed between the housing 206 and the flange 210 such that an interface 218 is formed therebetween. The flange 210 includes an extension 220 that extends in a direction of the housing cover 208 and the housing cover 208 includes a groove 222 configured to receive at least a portion of the extension 220. The extension 220 and the groove 222 collectively define a tortuous path 225 at the interface 218. As such, when an individual attempts to insert an object 224 between the flange 210 and the housing cover 208 at the interface 218, the extension 220 and the groove 222 cooperate to restrict the maximum insertion distance and/or prevent insertion of the object 224. In other words, the tortuous path 225 is configured to prevent the object 224 from being inserted between (or past) the extension 220 and the groove 222.

The flange 210 and the lighting assembly 204 are disposed on opposing sides of the ceiling 202. For example, at least a portion of the flange 210 may be configured to directly contact a room facing side 226 of the ceiling 202. The lighting assembly 204 may include a plurality of light emitting diodes 228, a heat sink 230, and an assembly cover 232. As shown, the assembly cover 232 and the housing cover 208 are disposed at opposing ends of the housing 206 (e.g., on opposing sides of the ceiling 202).

Figure 3:
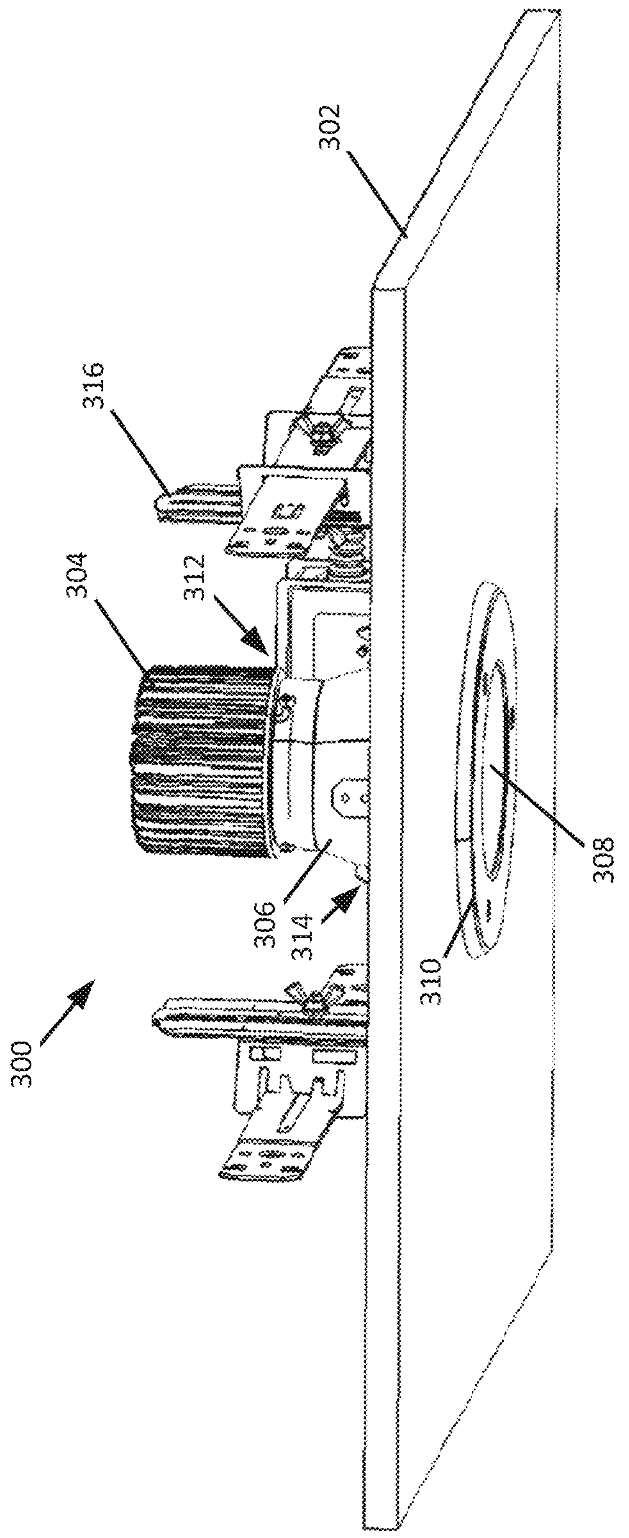
FIG. 3 is a perspective view of a vandal resistant light installed within a ceiling, consistent with embodiments of the present disclosure.

FIG. 3 is a perspective view of a vandal resistant light 300 installed within a ceiling 302, which is an example of the vandal resistant light 200 of FIG. 2. As shown, the vandal resistant light 300 includes a lighting assembly 304 configured to generate light, a housing 306 extending from the lighting assembly 304, an at least partially transparent housing cover 308, and a flange 310. The lighting assembly 304 is disposed at a first end 312 of the housing 306 and the housing cover 308 and flange 310 are disposed at a second end 314 of the housing 306. As shown, the housing cover 308 is disposed between the flange 310 and the housing 306. The vandal resistant light 300 is coupled to a frame 316 that is configured to support the vandal resistant light 300 within the ceiling 302. The housing cover 308 may be formed of a polycarbonate, a glass, an acrylic, and/or any other at least partially transparent material. The housing cover 308 may form a lens (e.g., be configured to shape light passing therethrough).

Figure 4:
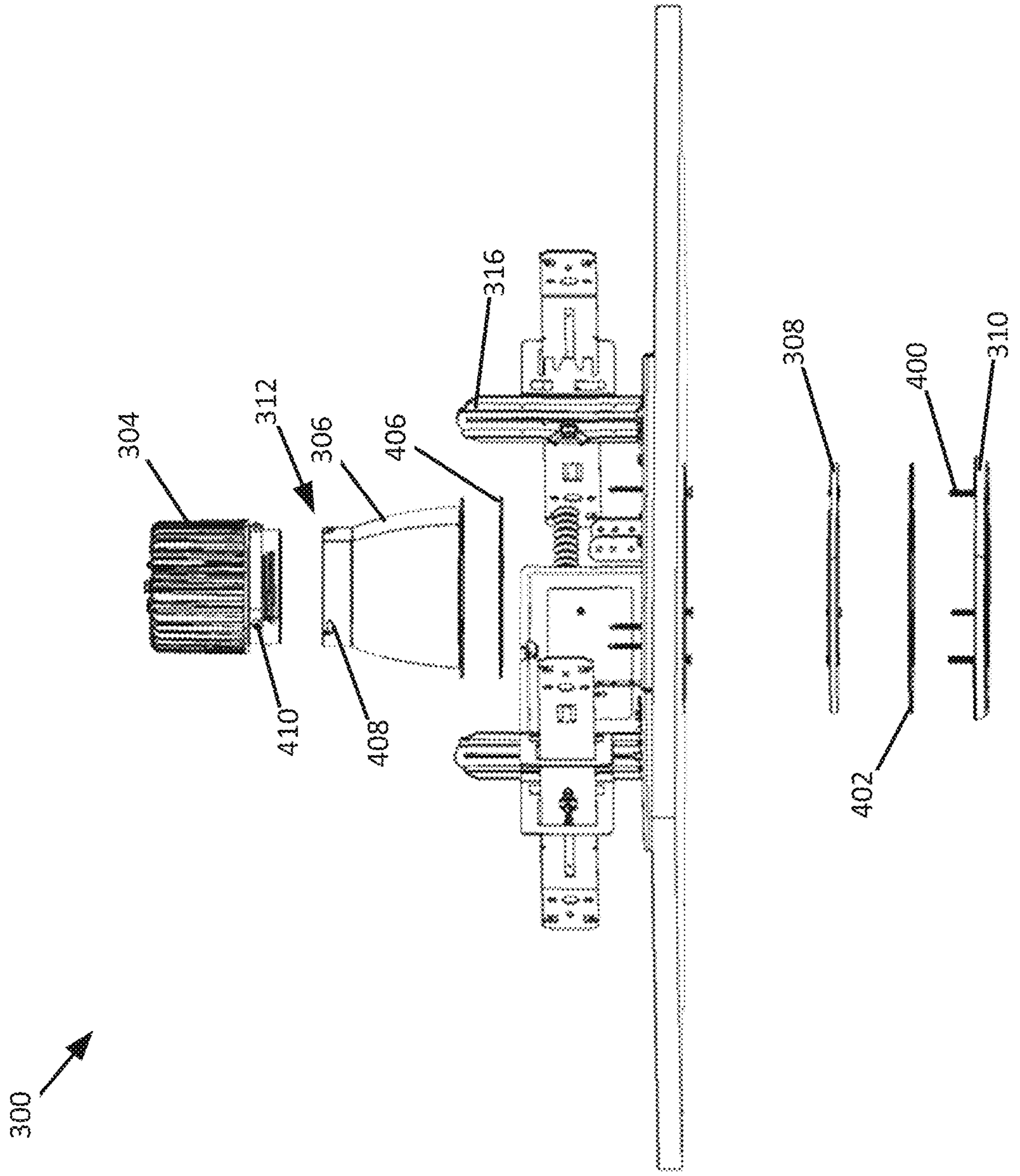
FIG. 4 is a perspective exploded view of the vandal resistant light of FIG. 3, consistent with embodiments of the present disclosure.

FIG. 4 is an exploded perspective view of the vandal resistant light 300 of FIG. 3. As shown, one or more flange fasteners 400 (e.g., a threaded fastener, such as, a bolt or screw) may be configured to couple the flange 310 to the frame 316. A flange adhesive layer 402 may be coupled to the flange 310 such that the flange adhesive layer 402 extends between the housing cover 308 and the flange 310. The flange adhesive layer 402 may be a double-sided adhesive tape such that the flange adhesive layer 402 adhesively couples the housing cover 308 to the flange 310. The flange adhesive layer 402 may define an enclosed area that is greater than or equal to the area of the housing cover 308 that is viewable within the environment. For example, the flange adhesive layer 402 may be a ring, an open rectangle (e.g., an open square), and/or any other shape that defines an open area.

The one or more flange fasteners 400 may be configured to extend through the housing cover 308 to couple the housing cover 308 to the frame 316. In other words, the one or more flange fasteners 400 may extend through the housing cover 308 and the flange 310. A cover adhesive layer 406 may be coupled to the housing cover 308 such that the cover adhesive layer 406 extends between the housing cover 308 and the housing 306. The cover adhesive layer 406 may be a double-sided adhesive tape such that the cover adhesive layer 406 adhesively couples the housing cover 308 to the housing 306. The cover adhesive layer 406 may define an enclosed area that is greater than or equal to the area of the housing cover 308 that is viewable within the environment. For example, the cover adhesive layer 406 may be a ring, an open rectangle (e.g., an open square), and/or any other shape that defines an open area.

The flange and cover adhesive layers 402 and 406 may be a volumetric adhesive. For example, the flange and cover adhesive layers 402 and 406 may be double-sided acrylic foam tapes. One commercially available example of an acrylic foam tape is offered for sale by the 3M Corporation under the trademark VHB tape. However, other types of volumetric adhesives may be used as the flange and cover adhesive layers 402 and 406. For example, instead of being a tape based adhesive, the adhesive may be applied in a liquid or gel form. In some instances, the flange adhesive layer 402 may have different properties from the cover adhesive layer 406 (e.g., the flange adhesive layer 402 may be formed of a first adhesive tape and the cover adhesive layer 406 may be formed of a second adhesive tape, the first adhesive tape being different from the second adhesive tape).

In use, the flange and/or cover adhesive layers 402 and/or 406 may mitigate and/or prevent the ingress of dust and/or moisture into the housing 306. For example, the vandal resistant light 300 may be configured to have an ingress protection rating of at least IP66. Additionally, or alternatively, the flange and/or cover adhesive layers 402 and/or 406 may be configured to at least partially absorb impact energy (e.g., as a result of an individual striking the housing cover 308) in an effort to mitigate a risk of damage to the vandal resistant light 300 (e.g., the housing cover 308) as a result of an impact. For example, the vandal resistant light 300 may have an impact rating of IK10. In this example, the vandal resistant light 300 may be configured to maintain an ingress protection rating of IP66 even after receiving an impact consistent with the IK10 impact rating.

As also shown, the housing 306 may include at least a portion of a bayonet fitting for removably coupling the lighting assembly 304 to the housing 306. For example, the housing 306 may include a slot portion 408 of the bayonet fitting and the lighting assembly 304 may include a protrusion portion 410 of the bayonet fitting, wherein the protrusion portion 410 is configured to be received within the slot portion 408. The slot portion 408 may be formed at the first end 312 of the housing 306 and include an open end for receiving the protrusion portion 410.

Figure 5:
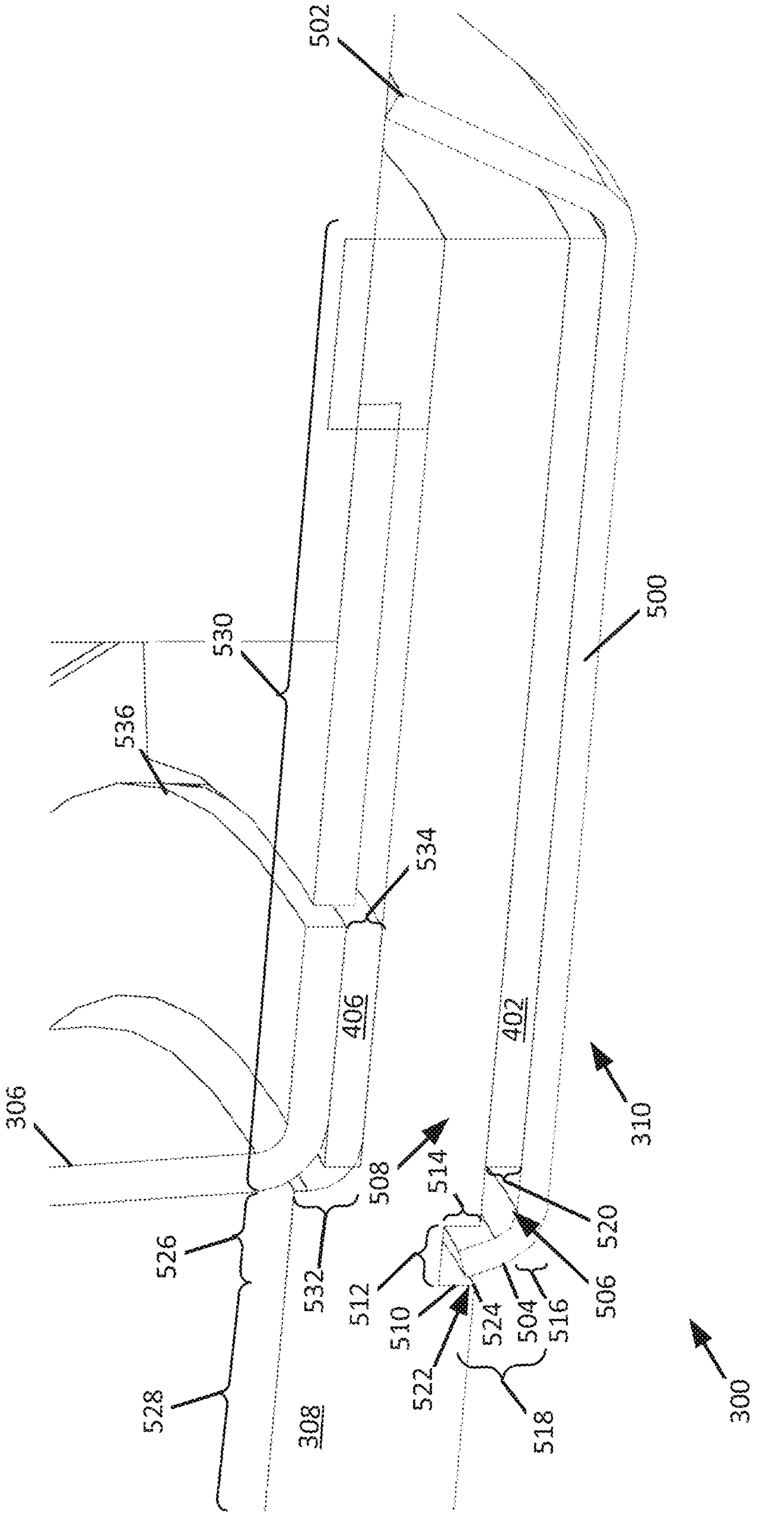
FIG. 5 is a magnified cross-sectional view of a portion of the vandal resistant light of FIG. 3, consistent with embodiments of the present disclosure.

FIG. 5 is a magnified cross-sectional perspective view of a portion of the vandal resistant light 300. As shown, the flange 310 includes a base 500, a covering 502 extending from the base 500 and in a direction transverse to the base 500, and an extension 504 extending from the base 500 and in a direction transverse to the base 500. The covering 502 and the extension 504 are disposed on opposing sides of a center line of the base 500. For example, the base 500 may have an annular shape having an annular centerline, wherein the covering 502 and the extension 504 are disposed on opposing sides of the annular centerline. In some instances, the flange 310 may be a single sheet of material formed (e.g., stamped) into a shape (e.g., by bending) that includes the base 500, the covering 502, and the extension 504. However, other methods of formation are possible (e.g., casting, injection molding, machining, and/or the like).

As shown, the base 500, the covering 502, and the extension 504 collectively define a concave region 506 having an open end 508 that opens in a direction of the housing cover 308. The flange adhesive layer 402 extends within the concave region 506. For example, when the flange 310 has an annular shape, the flange adhesive layer 402 may have a corresponding annular shape.

The housing cover 308 includes a groove 510 configured to receive at least a portion of the extension 504. The groove 510 may have a groove width 512 and a groove depth 514. The groove width 512 may be greater than a flange thickness 516. For example, the groove width 512 may be configured such that the groove 510 is able to receive the extension 504 when the extension 504 extends from the base 500 at a non-perpendicular angle. The groove depth 514 may be greater than an insertion distance of the extension 504. For example, the groove depth 514 may be greater than a difference between an extension height 518 and a flange adhesive thickness 520 of the flange adhesive layer 402. Such a configuration, may allow for a more compact assembly (e.g., the extension 504 may not impact the thickness of the assembly). The groove width 512 may be, for example, in a range of 1.5 millimeter (mm) to 3 mm and the groove depth 514 may be, for example, in a range of 1 mm to 2 mm. By way of further example, the groove width 512 may be about (e.g., within 1%, 2%, 5%, or 10% of) 2 mm and the groove depth 514 may be about 1.14 mm.

As shown, when at least a portion of the extension 504 is received within the groove 510, a tortuous path 522 is defined between one or more sidewalls 524 of the groove 510 and the extension 504. The tortuous path 522 is configured to impede and/or prevent the insertion of an object between the flange 310 and the housing cover 308. As such, the tortuous path 522 may reduce a ligature risk of the vandal resistant light 300 by removing a potential ligature point (e.g., at the interface formed between the flange 310 and the housing cover 308).

The groove 510 and/or the extension 504 may also be configured to cooperate to reflect and/or diffuse light incident thereon. The reflection and/or diffusion of light incident on the groove 510 and/or the extension 504 may result in the creation of a reflective and/or refractive region 526 that extends about an exposed portion 528 of the housing cover 308. Light within the reflective and/or refractive region 526 may have the appearance of a glowing shape (e.g., ring) that encloses the exposed portion 528. The exposed portion 528 of the housing cover 308 may generally be described as the portion of the housing cover 308 that is viewable within the environment. Light within the reflective and/or refractive region 526 may at least partially obscure the housing 306, the cover adhesive layer 406, and/or at least a portion of the housing cover 308 that is obscured by the flange 310. As such, the reflective and/or refractive region 526 may improve the aesthetic appearance of the vandal resistant light 300 (e.g., by making a visible portion of the assembly appear thinner). Additionally, or alternatively, the extension 504 may be shaped to obscure at least a portion of the housing cover 308 that extends between the groove 510 and the covering 502 and/or to obscure an edge of the extension 504.

As also shown, the housing cover 308 may include a stepped down region 530 having a step depth 532 that is greater than or equal to a cover adhesive thickness 534 of the cover adhesive layer 406. Such a configuration, may allow for a more compact assembly. The stepped down region 530 extends around (e.g., encloses) the exposed portion 528 of the housing cover 308. The housing 306 includes a foot 536 configured to couple with the cover adhesive layer 406. A difference in height between the stepped down region 530 and the exposed portion 528 may help with alignment of the housing cover 308 within the housing 306.

Figure 6:
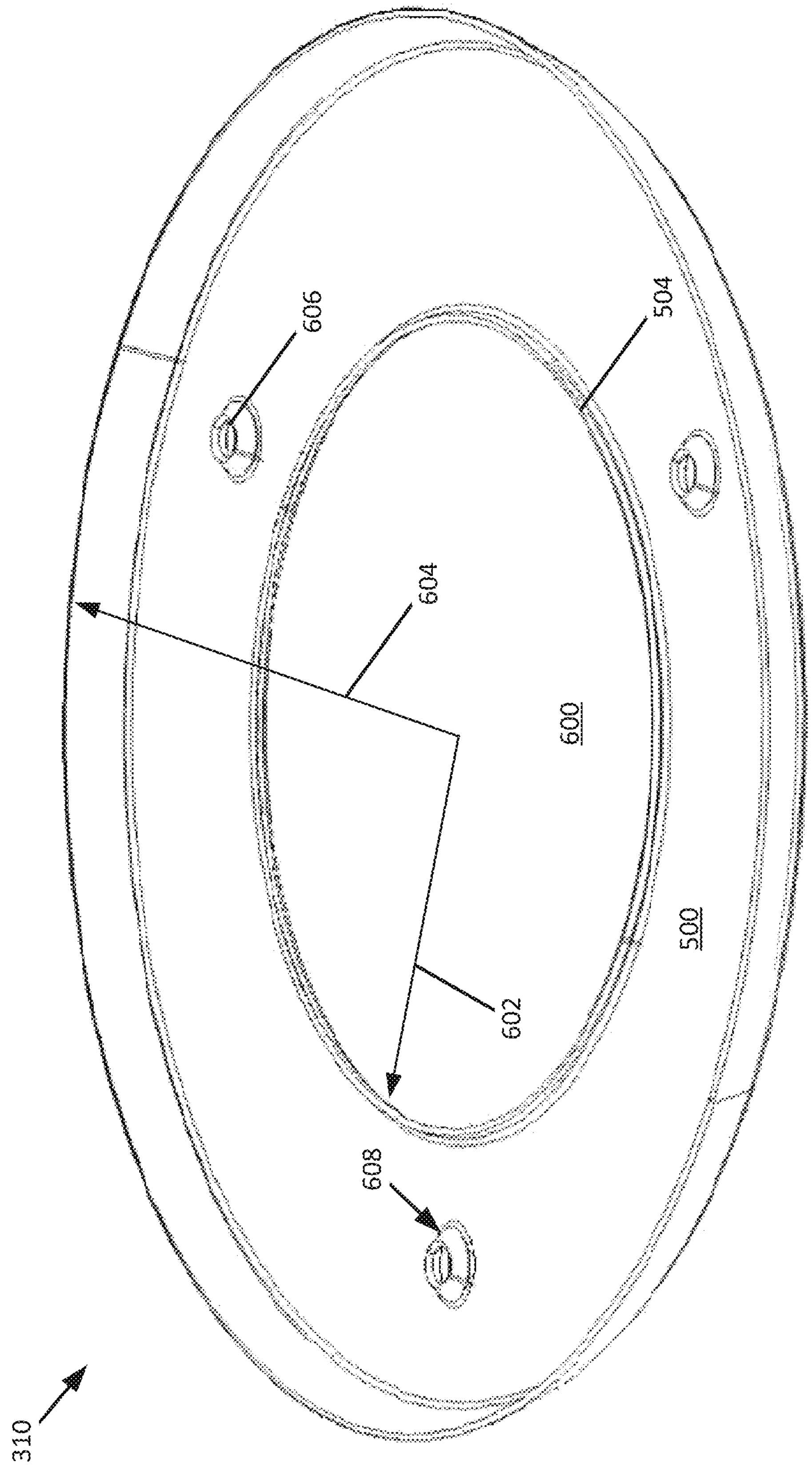
FIG. 6 is a perspective view of a flange of the vandal resistant light of FIG. 3, consistent with embodiments of the present disclosure.

FIG. 6 shows a perspective view of the flange 310. As shown, the flange 310 has an annular shape that encloses an internal area 600. The internal area 600 generally corresponds to the exposed portion 528 (FIG. 5) of the housing cover 308 (FIG. 3). The flange 310 has an inner radius 602 and an outer radius 604, the outer radius 604 being greater than the inner radius 602. As shown, the extension 504 is continuous and defines the inner radius 602. When the extension 504 extends from the base 500 at a non-perpendicular angle, the inner radius 602 may decrease in a direction of the housing cover 308.

Figure 6A:
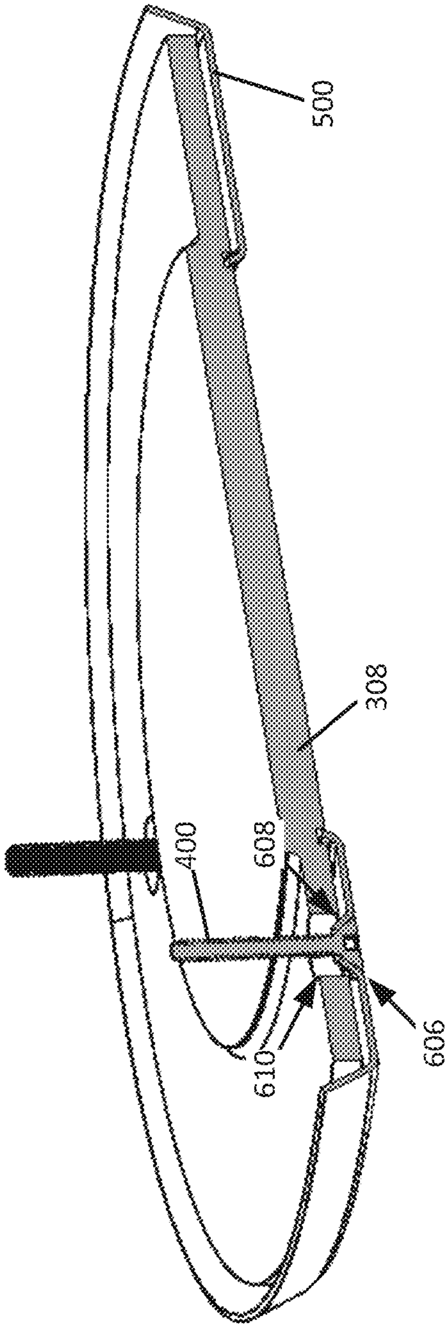
FIG. 6A is a cross-sectional perspective view of the flange of FIG. 6 having a housing cover coupled thereto, consistent with embodiments of the present disclosure.

As shown FIG. 6A, the base 500 may include one or more flange mounting holes 606 for receiving a corresponding one of the one or more flange fasteners 400. The mounting holes 606 may be counter-sunk. In some instances, the mounting holes 606 may be counter-sunk such that a counter-sunk region 608 extends from the base 500 and is, at least partially, received within a corresponding fastener opening

610 within the housing cover 308 (e.g., to encourage alignment of the housing cover 308 with the flange 310).

Figure 7:
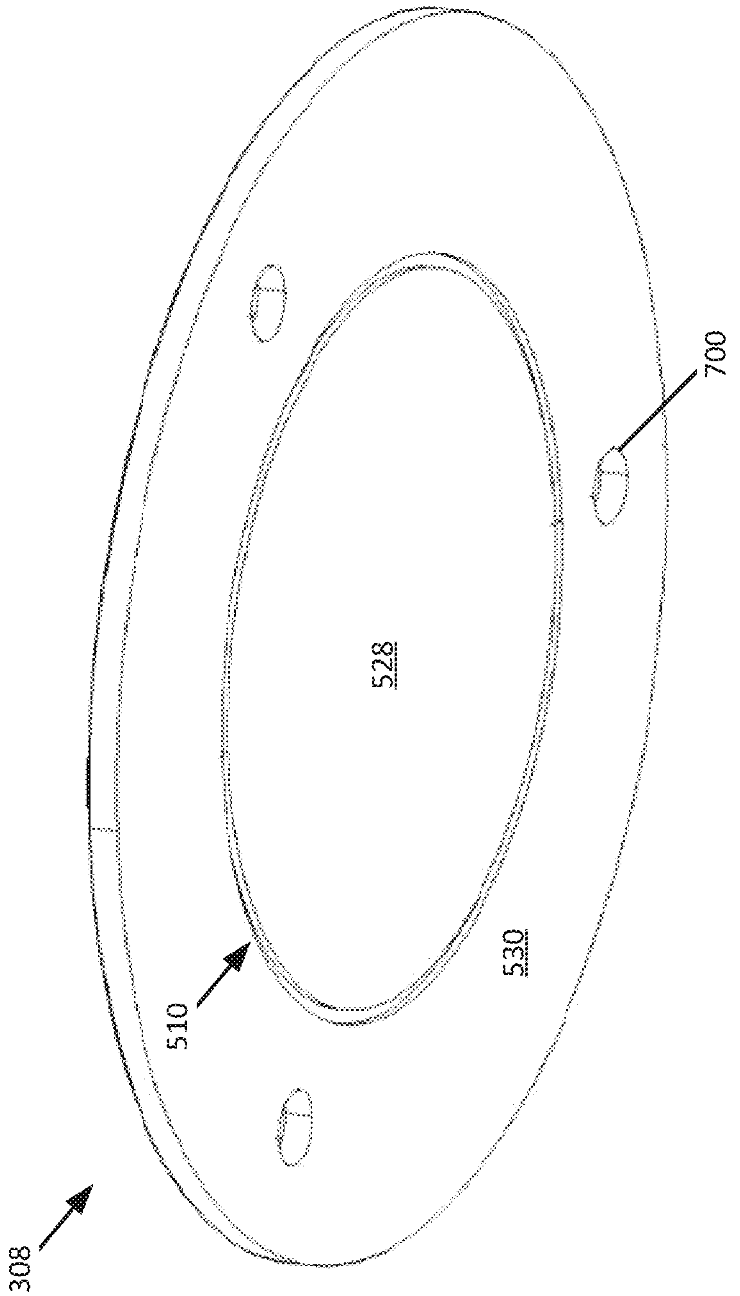
FIG. 7 is a perspective view of a housing cover of the vandal resistant light of FIG. 3, consistent with embodiments of the present disclosure.

FIG. 7 shows a perspective view of the housing cover 308. As shown, the housing cover 308 has a circular shape. The groove 510 extends around the exposed portion 528 and encloses (completely surrounds) the exposed portion 528 of the housing cover 308. The stepped down region 530 of the housing cover 308 and the exposed portion 528 of the housing cover 308 are on opposing sides of the groove 510. The stepped down region of the housing cover 308 includes one or more cover mounting holes 700 for receiving the one or more flange fasteners 400 (FIG. 4). The groove 510 may have a shape that generally corresponds to a shape of the flange 310 (FIG. 3). For example, the groove 510 may have a shape that generally corresponds to a shape of the internal area 600 (FIG. 6) enclosed by the flange 310. As shown, the groove 510 has an annular shape that encloses the exposed portion 528. The groove 510 extends continuously and uninterruptedly about the exposed portion 528, enclosing (e.g., encircling) the exposed portion 528.

Figure 8:
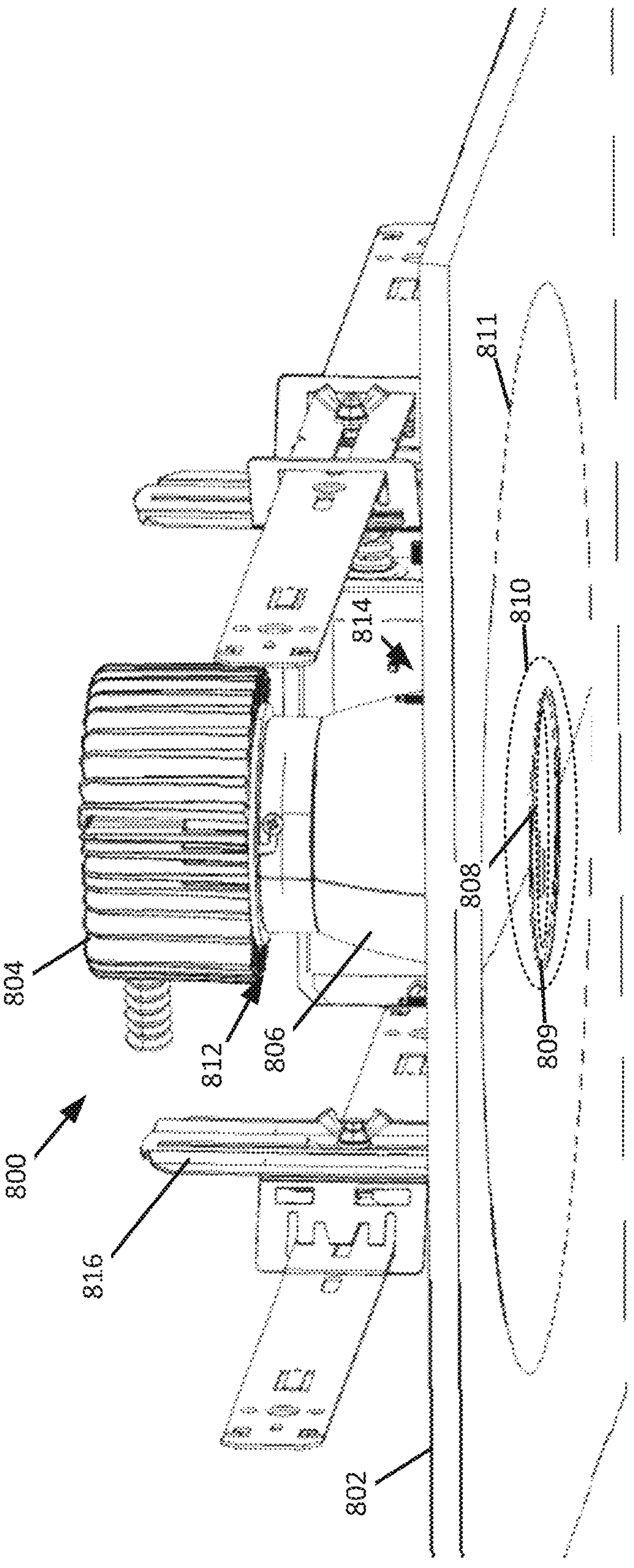
FIG. 8 is a perspective view of a vandal resistant light installed within a ceiling, consistent with embodiments of the present disclosure.

FIG. 8 is a perspective view of a vandal resistant light 800 installed within a ceiling 802, which is an example of the vandal resistant light 200 of FIG. 2. As shown, the vandal resistant light 800 includes a lighting assembly 804 configured to generate light, a housing 806 extending from the lighting assembly 804, an at least partially transparent housing cover 808 (shown in hidden lines) having a removable protector 809 removably coupled thereto, and an obscured flange 810 (shown in hidden lines) configured to be at least partially obscured by, for example, joint compound 811. The lighting assembly 804 is disposed at a first end 812 of the housing 806 and the housing cover 808 and flange 810 are disposed at a second end 814 of the housing 306. As shown, the housing cover 808 is disposed between the flange 810 and the housing 806. The vandal resistant light 800 is coupled to a frame 816 that is configured to support the vandal resistant light 800 within the ceiling 802. The housing cover 808 may be formed of a polycarbonate material and/or may form a lens (e.g., be configured to shape light passing therethrough).

Figure 9:
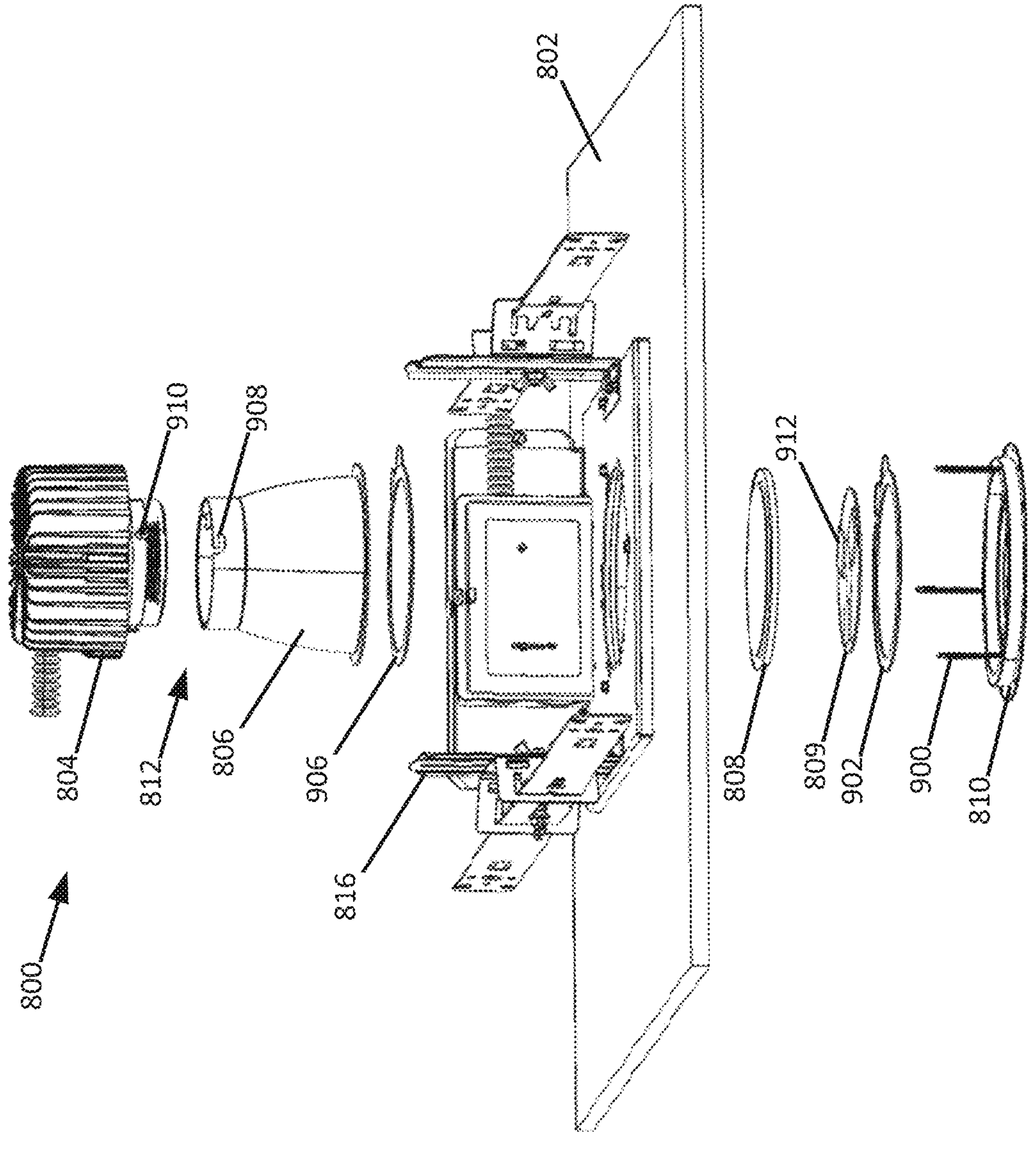
FIG. 9 is a perspective exploded view of the vandal resistant light of FIG. 8, consistent with embodiments of the present disclosure.

FIG. 9 shows an exploded perspective view of the vandal resistant light 800 of FIG. 8. As shown, one or more flange fasteners 900 may be configured to couple the flange 810 to the frame 816. A flange adhesive layer 902 may be coupled to the flange 810 such that the flange adhesive layer 902 extends between the housing cover 808 and the flange 810. The flange adhesive layer 902 may be a double-sided adhesive tape such that the flange adhesive layer 902 adhesively couples the housing cover 808 to the flange 810. The flange adhesive layer 902 may define an enclosed area that is greater than or equal to the area of the housing cover 808 that is viewable within the environment. For example, the flange adhesive layer 902 may be a ring, an open rectangle (e.g., a square), and/or any other shape that defines an open area.

A cover adhesive layer 906 may be coupled to the housing cover 808 such that the cover adhesive layer 906 extends between the housing cover 808 and the housing 806. The cover adhesive layer 906 may be a double-sided adhesive tape such that the cover adhesive layer 906 adhesively couples the housing cover 808 to the housing 806. The cover adhesive layer 906 may define an enclosed area that is greater than or equal to the area of the housing cover 808 that is viewable within the environment. For example, the cover adhesive layer 906 may be a ring, an open rectangle (e.g., a square), and/or any other shape that defines an open area.

The flange and cover adhesive layers 902 and 906 may be a volumetric adhesive. For example, the flange and cover adhesive layers 902 and 906 may be double-sided acrylic foam tapes. One commercially available example of an acrylic foam tape is offered for sale by the 3M Corporation under the trademark VHB tape. However, other types of volumetric adhesives may be used as the flange and cover adhesive layers 902 and 906. For example, instead of being a tape based adhesive, the adhesive may be applied in a liquid or gel form. In some instances, the flange adhesive layer 902 may have different properties from the cover adhesive layer 906 (e.g., the flange adhesive layer 902 may be formed of a first adhesive tape and the cover adhesive layer 906 may be formed of a second adhesive tape, the first adhesive tape being different from the second adhesive tape).

In use, the flange and/or cover adhesive layers 902 and/or 906 may mitigate and/or prevent the ingress of dust and/or moisture into the housing 806. For example, the vandal resistant light 800 may be configured to have an ingress protection rating of at least IP66. Additionally, or alternatively, the flange and/or cover adhesive layers 902 and/or 906 may be configured to at least partially absorb impact energy (e.g., as a result of an individual striking the housing cover 808) in an effort to mitigate a risk of damage to the vandal resistant light 800 (e.g., the housing cover 808) as a result of an impact. For example, the vandal resistant light 800 may have an impact rating of IK10. In this example, the vandal resistant light 800 may be configured to maintain an ingress protection rating of IP66 even after receiving an impact consistent with the IK10 impact rating.

As also shown, the housing 806 may include at least a portion of a bayonet fitting for removably coupling the lighting assembly 804 to the housing 806. For example, the housing 806 may include a slot portion 908 of the bayonet fitting and the lighting assembly 804 may include a protrusion portion 910 of the bayonet fitting. The slot portion 908 may be formed at the first end 812 of the housing 806 and include an open end for receiving the protrusion portion 910.

As shown, the removable protector 809 includes one or more protector adhesives 912 configured to removably couple the removable protector 809 to the housing cover 808. The removable protector 809 is configured to protect the housing cover 808 when the vandal resistant light 800 is being installed into the ceiling 802. For example, when the joint compound 811 (FIG. 8) is applied to the flange 810, the removable protector 809 may be configured to prevent the joint compound 811 from inadvertently being applied to the housing cover 808.

Figure 10:
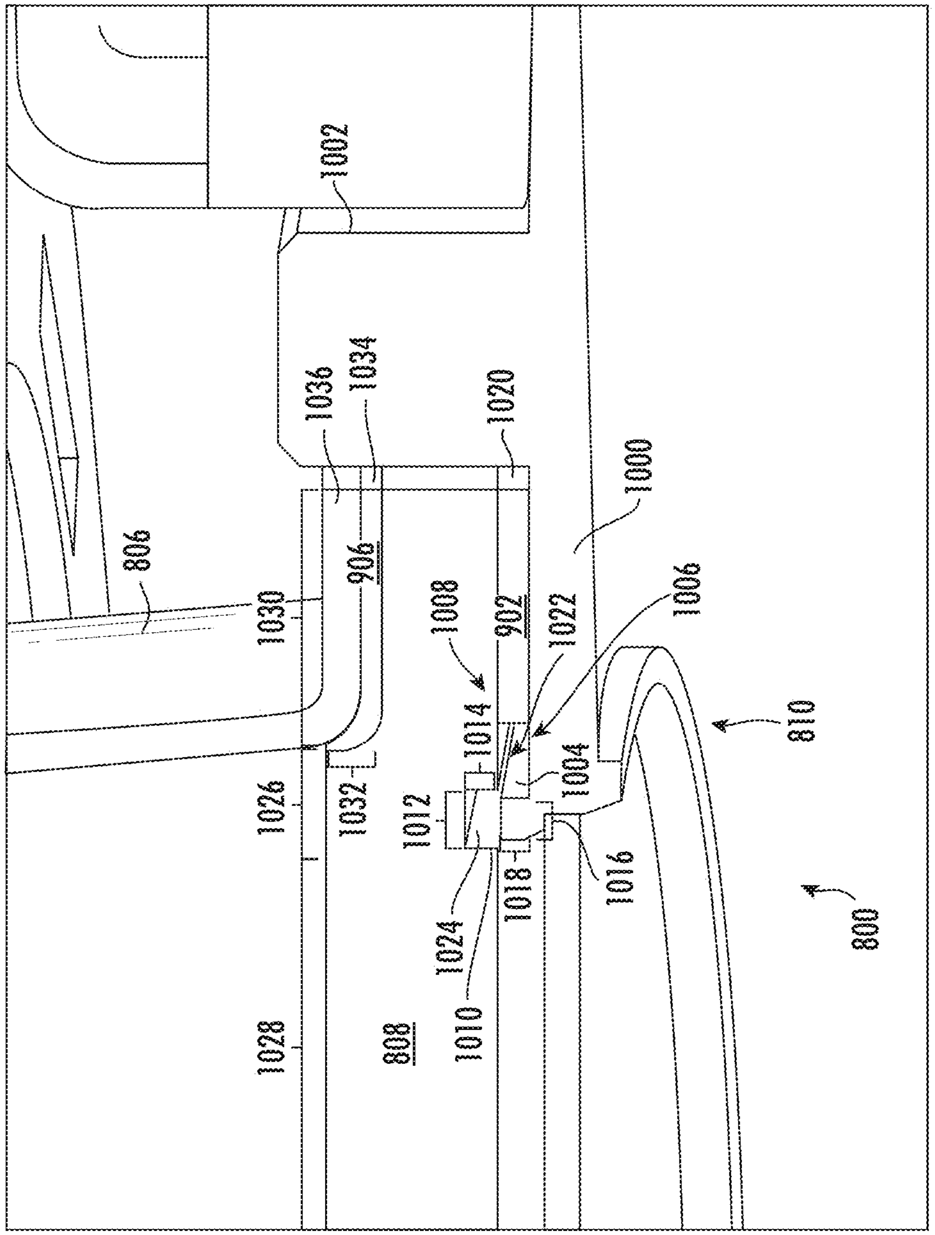
FIG. 10 is a magnified cross-sectional view of a portion of the vandal resistant light of FIG. 8, consistent with embodiments of the present disclosure.

FIG. 10 is a magnified cross-sectional perspective view of a portion of the vandal resistant light 800. As shown, the flange 810 includes a base 1000, a mounting partition 1002 extending from the base 1000, and an extension 1004 extending from the base 1000. The mounting partition 1002 and the extension 1004 are disposed on opposing sides of the flange adhesive layer 902. In some instances, the flange 810 may be machined from a single piece of material. However, other methods of formation are possible (e.g., casting, injection molding, stamping, and/or the like).

As shown, the base 1000, the mounting partition 1002, and the extension 1004 collectively define a concave region 1006 having an open end 1008 that opens in a direction of the housing cover 808. The flange adhesive layer 902 extends within the concave region 1006. For example, when the flange 810 has an annular shape, the flange adhesive layer 902 may have a corresponding annular shape.

The housing cover 808 includes a groove 1010 configured to receive at least a portion of the extension 1004. The groove 1010 may have a groove width 1012 and a groove depth 1014. The groove width 1012 may be greater than an extension thickness 1016. For example, the groove width 1012 may be configured such that the groove 1010 is able to receive the extension 1004 when the extension 1004 extends from the base 1000. The groove depth 1014 may be greater than an insertion distance of the extension 1004. For example, the groove depth 1014 may be greater than a difference between an extension height 1018 and a flange adhesive thickness 1020 of the flange adhesive layer 902. Such a configuration, may allow for a more compact assembly (e.g., the extension 1004 may not impact the thickness of the assembly). The groove width 1012 may be, for example, in a range of 1.5 mm to 3 mm and the groove depth 1014 may be, for example, in a range of 1 mm to 2 mm. By way of further example, the groove width 1012 may be about (e.g., with 1%, 2%, 5%, or 10% of) 0.75 mm and the groove depth 1014 may be about 1.27 mm.

As shown, when the extension 1004 is received within the groove 1010, a tortuous path 1022 is defined between one or more sidewalls 1024 of the groove 1010 and the extension 1004. The tortuous path 1022 is configured to impede and/or prevent the insertion of an object between the flange 810 and the housing cover 808. As such, the tortuous path 1022 may reduce a ligature risk of the vandal resistant light 800 by removing a potential ligature point (e.g., at the interface formed between the flange 810 and the housing cover 808).

The groove 1010 and/or the extension 1004 may also be configured to cooperate to reflect and/or diffuse light incident thereon. The reflection and/or diffusion of light incident on the groove 1010 and/or the extension 1004 may result in the creation of a reflective and/or refractive region 1026 that extends about an exposed portion 1028 of the housing cover 808. Light within the reflective and/or refractive region 1026 may have the appearance of a glowing shape (e.g., ring) that encloses the exposed portion 1028. The exposed portion 1028 of the housing cover 808 may generally be described as the portion of the housing cover 808 that is viewable within the environment. Light within reflective and/or refractive region 1026 may at least partially obscure the housing 806, the cover adhesive layer 906, and/or at least a portion of the housing cover 808 that is obscured by the flange 810. As such, the reflective and/or refractive region 1026 may improve the aesthetic appearance of the vandal resistant light 800 (e.g., by making a visible portion of the assembly appear thinner). Additionally, or alternatively, the extension 1004 may be shaped to obscure at least a portion of the housing cover 808 that extends between the groove 1010 and the mounting partition 1002 and/or to obscure an edge of the extension 1004.

As also shown, the housing cover 808 may include a stepped down region 1030 having a step depth 1032 that is greater than or equal to a cover adhesive thickness 1034 of the cover adhesive layer 906. Such a configuration may allow for a more compact assembly. The stepped down region 1030 extends around (e.g., encloses) the exposed portion 1028 of the housing cover 808. The housing 806 includes a foot 1036 configured to couple with the cover adhesive layer 906. A difference in height between the stepped down region 1030 and the exposed portion 1028 may help with alignment of the housing cover 808 within the housing 806.

Figure 11:
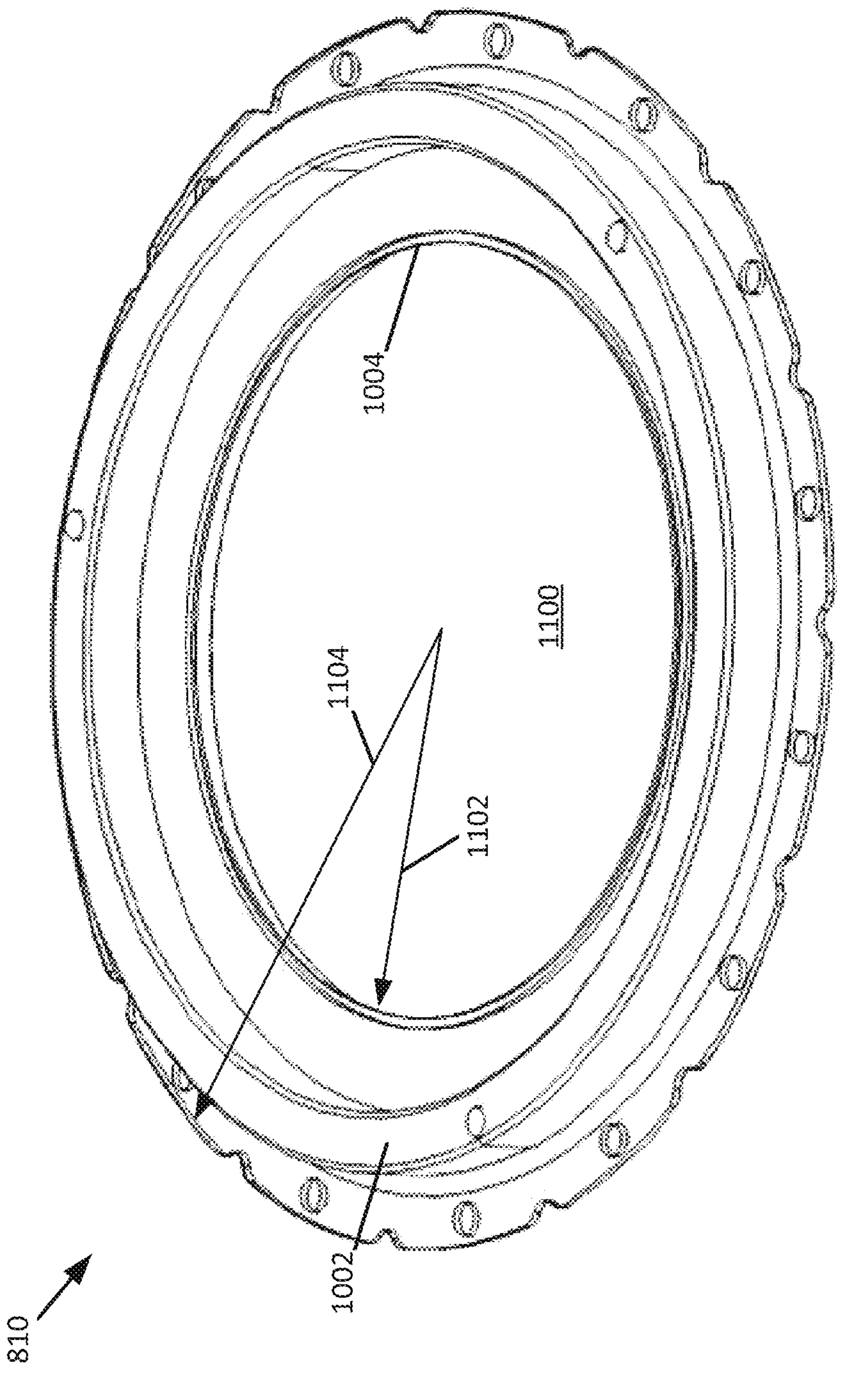
FIG. 11 is a perspective view of a flange of the vandal resistant light of FIG. 8, consistent with embodiments of the present disclosure.

FIG. 11 shows a perspective lighting assembly facing view of the flange 810. As shown, the flange 810 has an annular shape that encloses an internal area 1100. The internal area 1100 generally corresponds to the exposed portion 1028 (FIG. 10) of the housing cover 808 (FIG. 8). The flange 810 has an inner radius 1102 and an outer radius 1104, the outer radius 1104 being greater than the inner radius 1102. As shown, the extension 1004 is continuous and defines the inner radius 1102. When the extension 1004 extends from the base 1000 at a non-perpendicular angle, the inner radius 1102 may decrease in a direction of the housing cover 808.

The mounting partition 1002 includes one or more flange mounting holes 1106 for receiving the one or more flange fasteners 900 (FIG. 9). The mounting partition 1002 is radially disposed between the inner and outer radiuses 1102 and 1104. In some instances, the mounting partition 1002 may be configured to cooperate with the extension 1004 to align the housing cover 808 within the flange 810.

Figure 12:
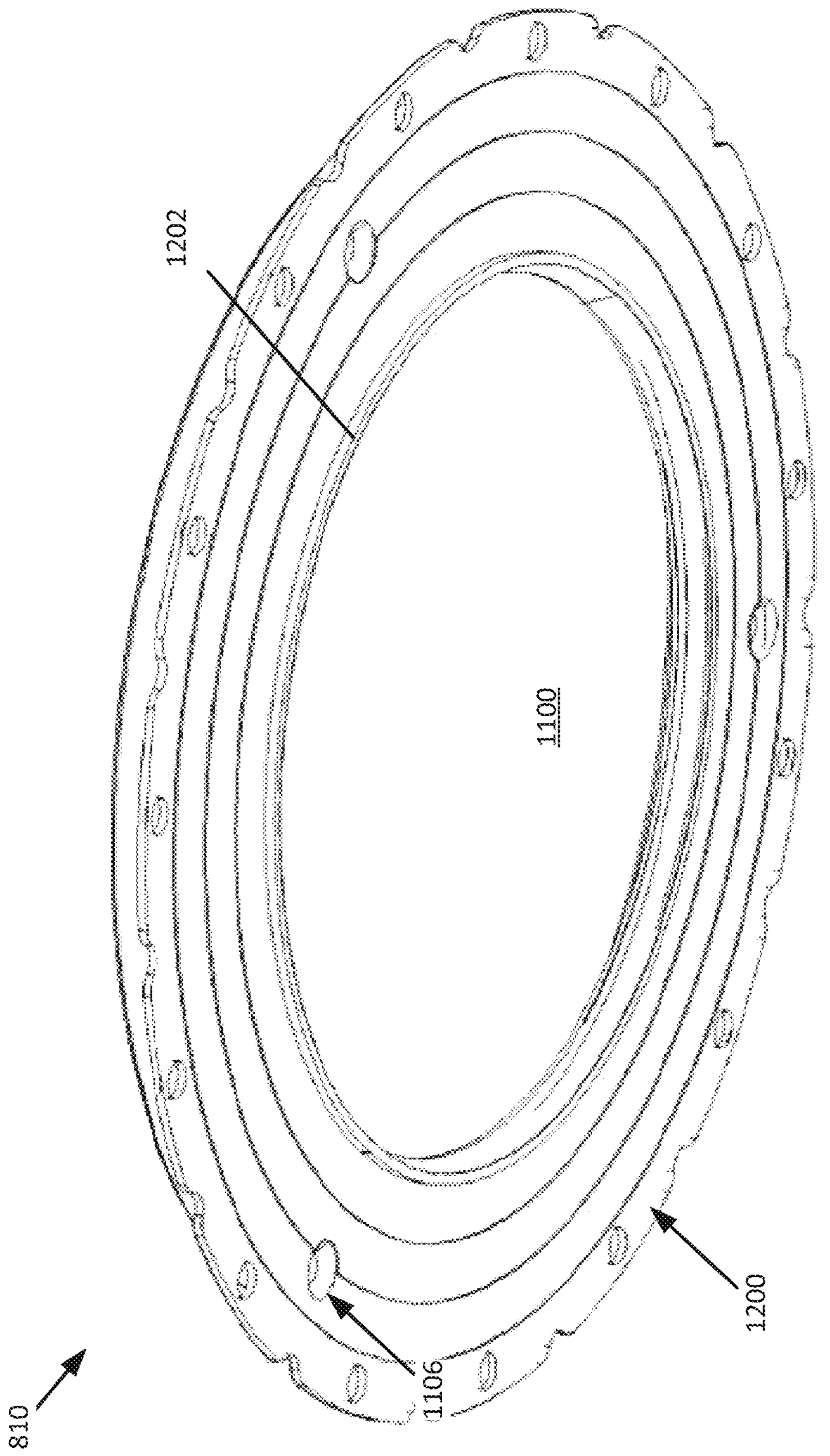
FIG. 12 is another perspective view of the flange of the vandal resistant light of FIG. 8, consistent with embodiments of the present disclosure.

FIG. 12 shows a perspective room facing view of the flange 810. As shown, the flange 810 includes a compound surface 1200 on which the joint compound 811 (FIG. 8) can be applied. The compound surface 1200 may be stepped or tapered to encourage a consistent application of the joint compound 811. A compound ridge 1202 may extend around the internal area 1100 of the flange 810. The compound ridge 1202 may be configured to discourage the application of the joint compound 811 within the internal area 1100, protecting the housing cover 808 (FIG. 8), and/or to enable a buildup of the joint compound 811 in order to encourage a consistent application of the joint compound 811. As shown, the flange mounting holes 1106 may be countersunk to encourage a consistent application of the joint compound 811.

Figure 13:
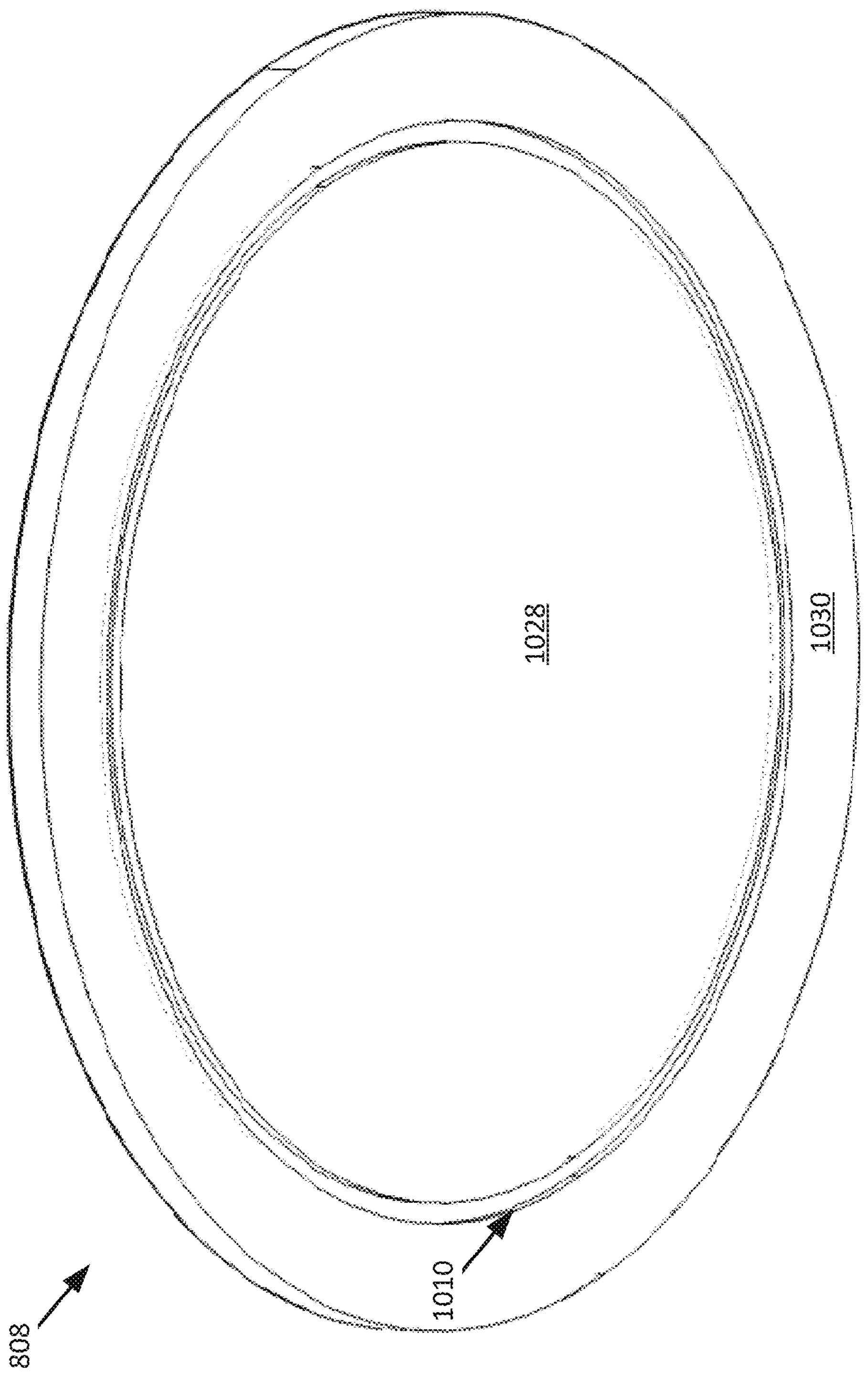
FIG. 13 is a perspective view of a housing cover of the vandal resistant light of FIG. 8, consistent with embodiments of the present disclosure.

FIG. 13 shows a perspective view of the housing cover 808. As shown, the housing cover 808 has a circular shape. The groove 1010 extends around the exposed portion 1028 and encloses (completely surrounds) the exposed portion 1028 of the housing cover 808. The stepped down region 1030 of the housing cover 808 and the exposed portion 1028 of the housing cover 808 are on opposing sides of the groove 1010. The groove 1010 may have a shape that generally corresponds to a shape of the flange 810 (FIG. 8). For example, the groove 1010 may have a shape that generally corresponds to a shape of internal area 1100 (FIG. 11) enclosed by the flange 810. As shown, the groove 1010 has an annular shape that encloses the exposed portion 1028. The groove 1010 extends continuously and uninterruptedly about the exposed portion 1028 enclosing (e.g., encircling) the exposed portion 1028.

Figure 14:
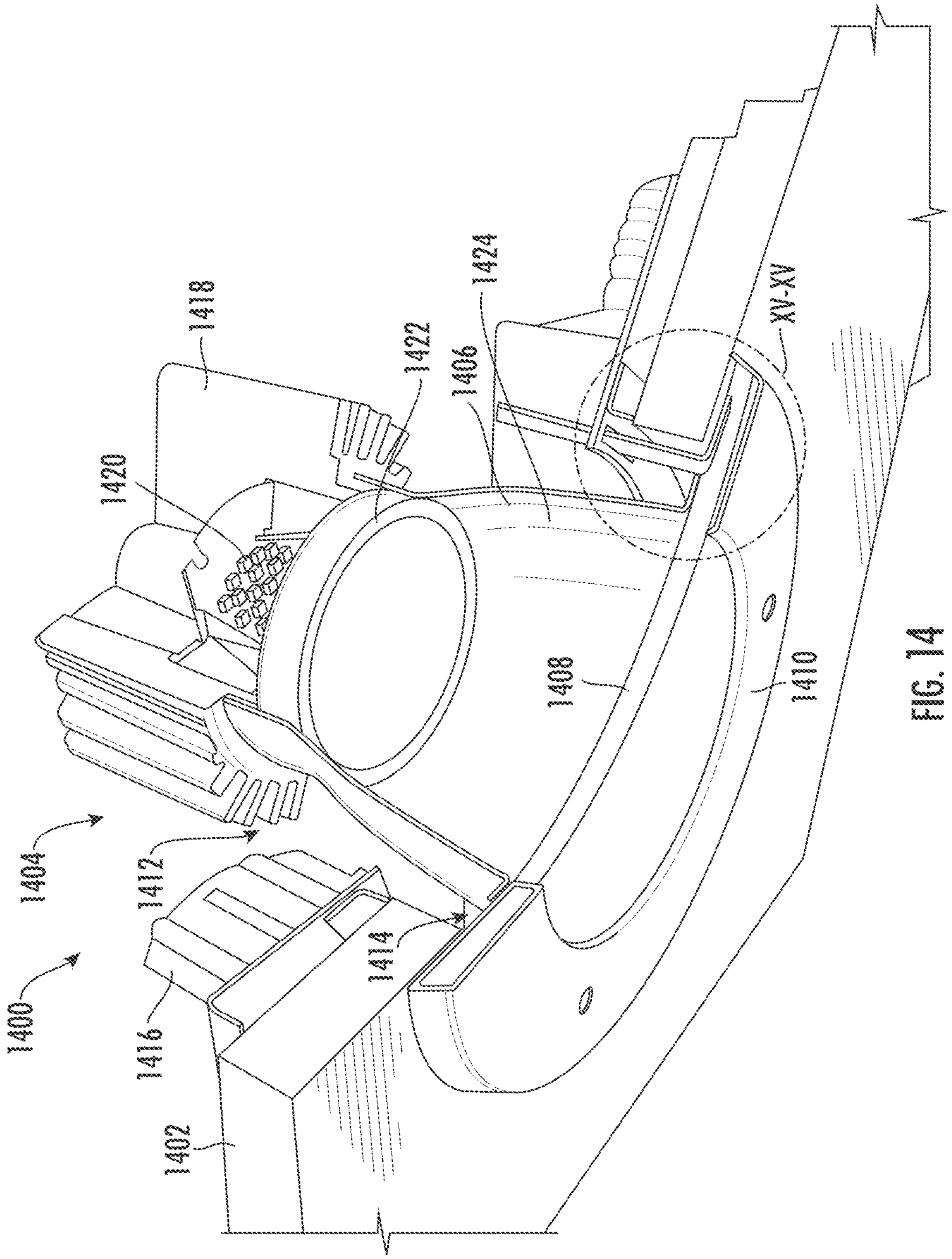
FIG. 14 is a perspective cutaway view of a vandal resistant light installed within a ceiling, consistent with embodiments of the present disclosure.

FIG. 14 shows a perspective cut-away view of a vandal resistant light 1400 installed within a ceiling 1402, which is an example of the vandal resistant light 300 of FIG. 3. As shown, the vandal resistant light 1400 includes a lighting assembly 1404 configured to generate light, a housing 1406 extending from the lighting assembly 1404, an at least partially transparent housing cover 1408, and a flange 1410. The lighting assembly 1404 is disposed at a first end 1412 of the housing 1406 and the housing cover 1408 and flange 1410 are disposed at a second end 1414 of the housing 1406. As shown, the housing cover 1408 is disposed between the flange 1410 and the housing 1406. The vandal resistant light 1400 is coupled to a frame 1416 that is configured to support the vandal resistant light 1400 within the ceiling 1402. The housing cover 1408 may be formed of a polycarbonate material and/or may form a lens (e.g., be configured to shape light passing therethrough).

As shown, the lighting assembly 1404 includes a heat sink 1418, a plurality of light emitting diodes (LEDs) 1420, and an assembly cover 1422 (e.g., a lens) through which light emitted from the LEDs 1420 passes. The assembly cover

1422 can be at least partially received within a light cavity 1424 of the housing 1406. As shown, the assembly cover 1422 and the housing cover 1408 are configured to be disposed on opposing sides of the ceiling 1402.

Figure 15:
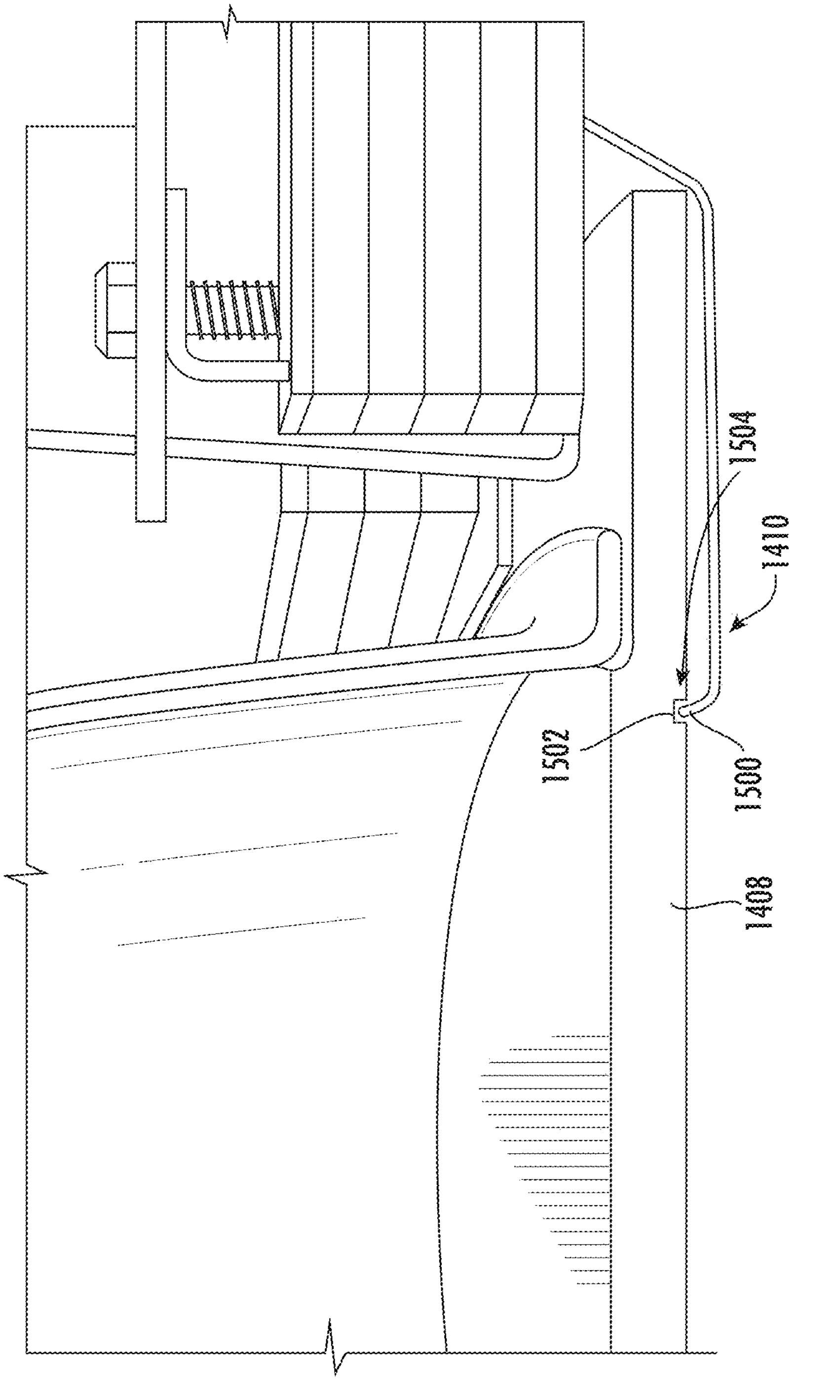
FIG. 15 is a magnified view of the vandal resistant light of FIG. 14 generally corresponding to region XV-XV of FIG. 14, consistent with embodiments of the present disclosure.

FIG. 15 is a magnified view of the vandal resistant light 1400 generally corresponding to region XV-XV of FIG. 14. As shown, the flange 1410 includes an extension 1500 configured to be received within a groove 1502 of the housing cover 1408, creating a tortuous path 1504 extending between the extension 1500 and the groove 1502.

Figure 16:
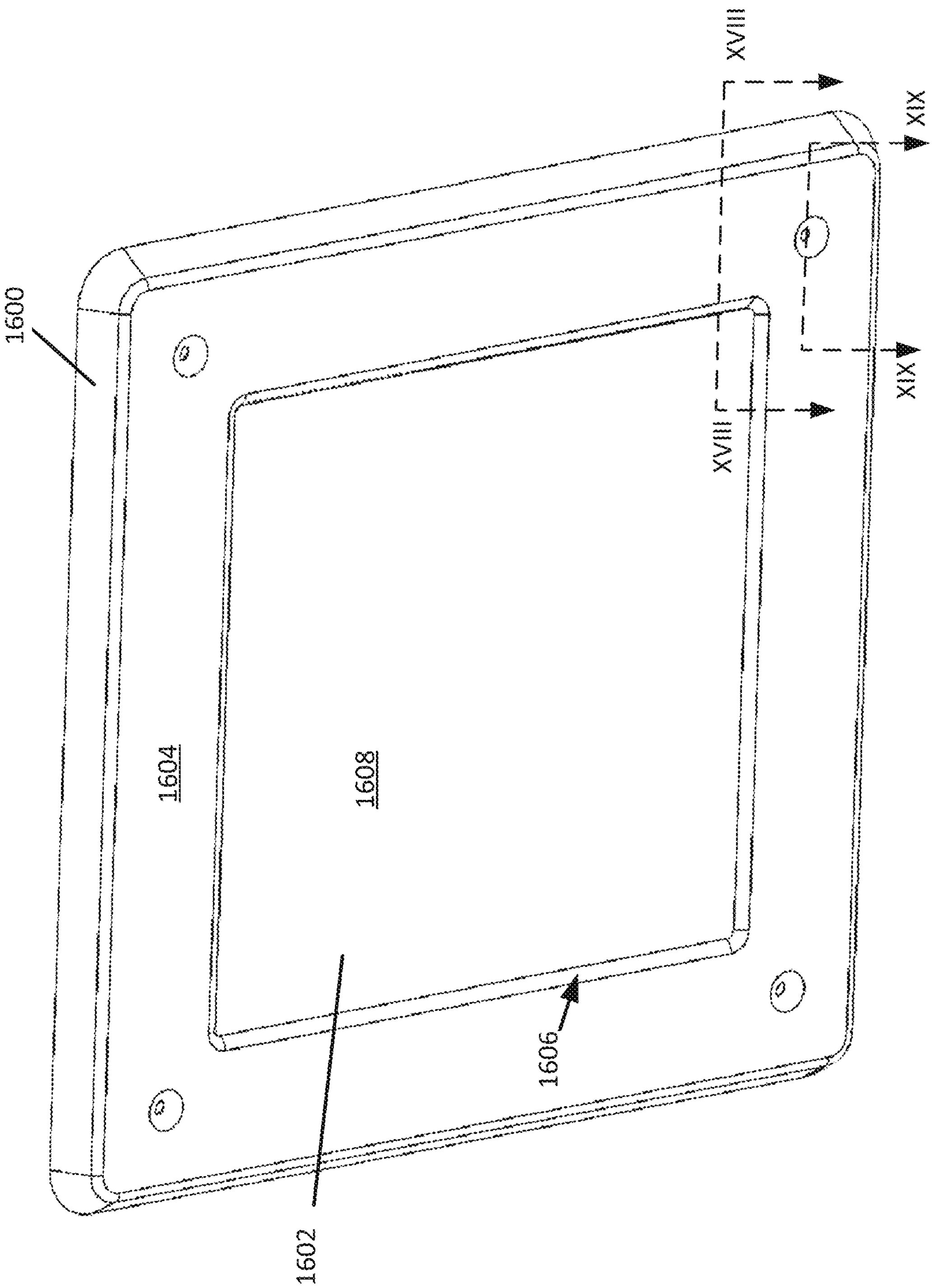
FIG. 16 is a perspective view of a flange having one or more linear sides and a housing cover, consistent with embodiments of the present disclosure.

FIG. 16 is a perspective view of a flange 1600, which is an example of the flange 210 of FIG. 2, and an at least partially transparent housing cover 1602, which is an example of the at least partially transparent housing cover 208 of FIG. 2, disposed within the flange 1600. In some instances, one or more features of the flanges 310 and/or 810 may be incorporated into the flange 1600.

Figure 17:
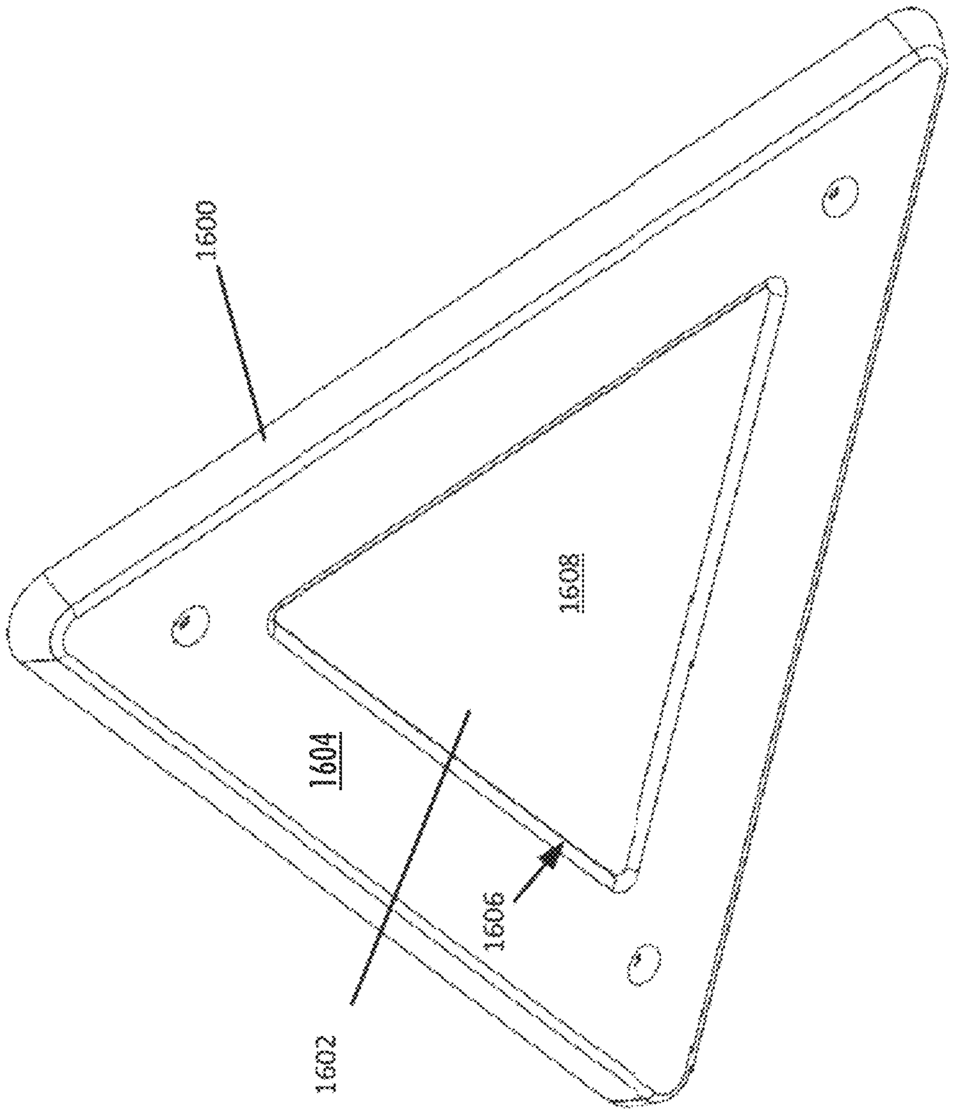
FIG. 17 is a perspective view of another example of the flange of FIG. 16, consistent with embodiments of the present disclosure.

As shown, the flange 1600 includes one or more linear sides 1604. For example, and as shown, the flange 1600 includes four intersecting linear sides 1604, which collectively form a rectangular shape (e.g., square shape). By way of further example, and as shown in FIG. 17, the flange 1600 includes three intersecting linear sides 1604, which collectively form a triangular shape (e.g., an equilateral triangular shape, an isosceles triangular shape, and/or any other triangular shape). The linear sides 1604 may each have the same length or one or more of the linear sides 1604 may have a different length from at least one other linear side 1604.

The flange 1600 encloses an open internal area 1606. The internal area 1606 generally corresponds to an exposed portion 1608 of the housing cover 1602, wherein light passes through the exposed portion 1608.

Figure 18:
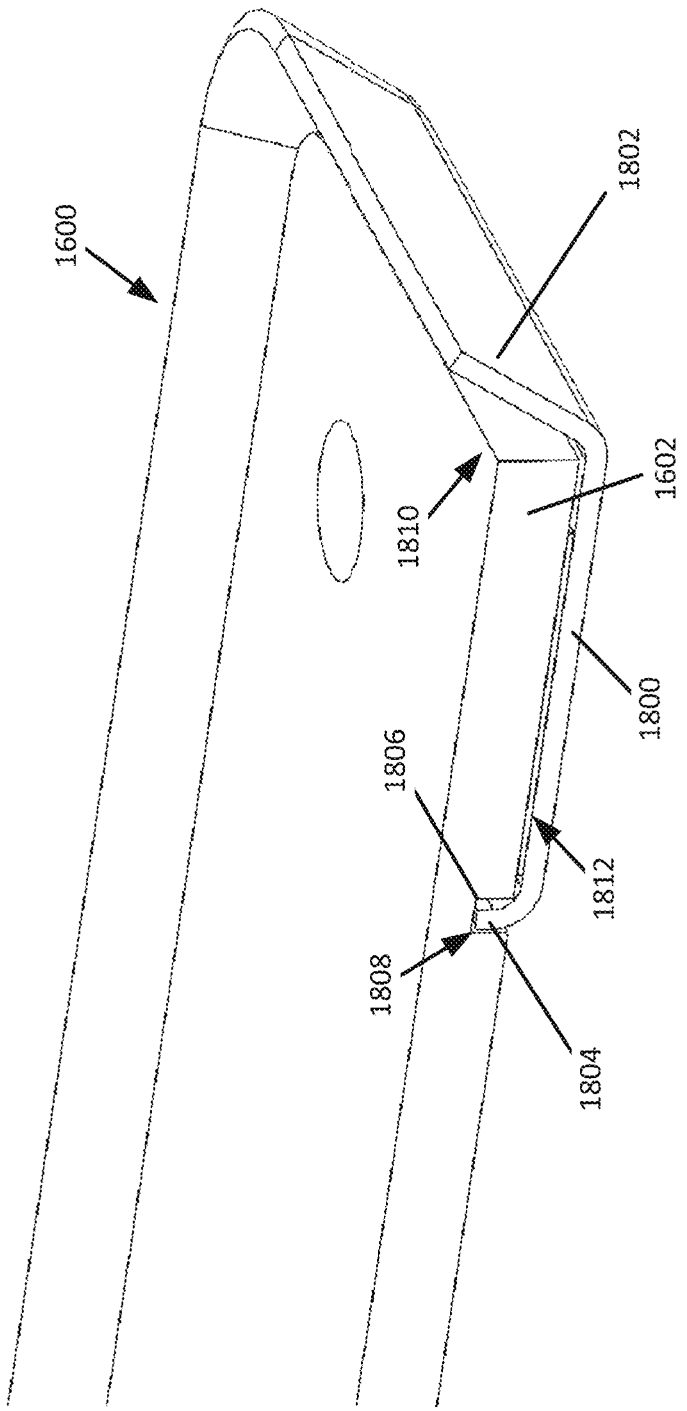
FIG. 18 is a cross-sectional perspective view of the flange of FIG. 16 taken along the line XVIII-XVIII, consistent with embodiments of the present disclosure.

FIG. 18 is a cross-sectional view of the flange 1600 taken along the line XVIII-XVIII of FIG. 16. As shown, the flange 1600 includes a base 1800, a covering 1802, and an extension 1804. The covering 1802 and the extension 1804 extend from opposing sides of the base 1800 in a direction of the housing cover 1602. The extension 1804 is configured to be received within a corresponding groove 1806 of the housing cover 1602 to create a tortuous path 1808 therebetween. The groove 1806 may have a shape that generally corresponds to a shape of the flange 1600 (e.g., rectangular, triangular, and/or any other shape). For example, the groove 1806 may have a shape that generally corresponds to a shape of internal area 1606 enclosed by the flange 1600. The groove 1806 extends around the exposed portion 1608 continuously and uninterruptedly, enclosing the exposed portion 1608. The extension 1804 may also extend continuously and uninterruptedly.

The covering 1802 extends around an outer perimeter 1810 of the housing cover 1602, wherein a concave region 1812 for receiving a portion of the housing cover 1602 is defined between the covering 1802 and the extension 1804.

Figure 19:
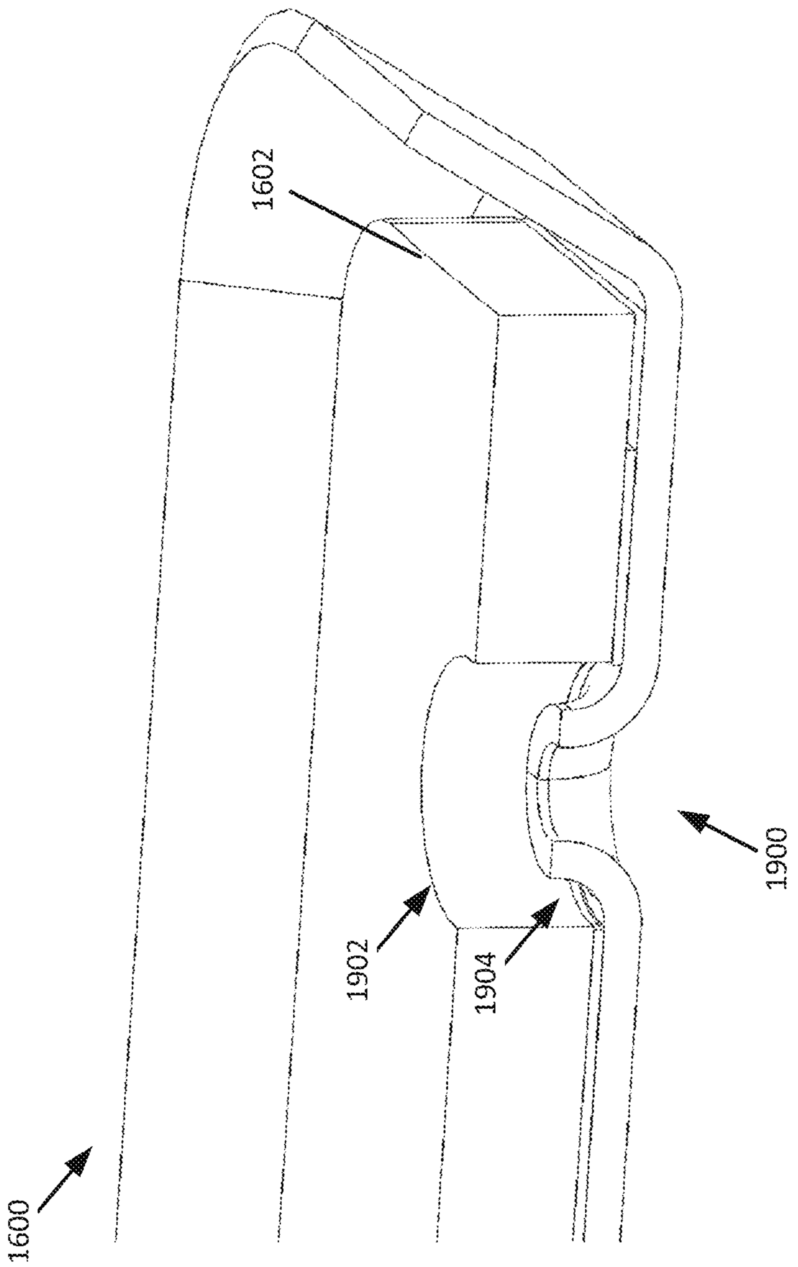
FIG. 19 is a cross-sectional perspective view of the flange of FIG. 16 taken along the line XIX-XIX, consistent with embodiments of the present disclosure.

FIG. 19 is a cross-sectional view of the flange 1600 taken along the line XIX-XIX of FIG. 16. As shown, the flange 1600 includes one or more flange mounting holes 1900. The flange mounting holes 1900 are configured to receive a fastener (e.g., a threaded fastener, such as, a bolt or a screw) and may be counter-sunk. As also shown, the housing cover 1602 may include one or more fastener openings 1902 that correspond to a respective flange mounting hole 1900. In some instances, at least a portion of a counter-sunk region 1904 of the flange mounting hole 1900 may extend into a corresponding fastener opening 1902. Such a configuration may encourage alignment of the housing cover 1602 within the flange 1600 (e.g., encourage alignment of a corresponding fastener opening 1902 with a corresponding flange mounting hole 1900).

An example of a vandal resistant light, consistent with the present disclosure, may include a housing having a first end and a second end, the first end opposite the second end, a lighting assembly disposed at the first end of the housing, a cover disposed at the second end of the housing, the cover includes a continuous uninterrupted groove that extends around and encloses an exposed portion of the cover, and a flange including an extension configured to be at least partially received within the continuous uninterrupted groove.

In some instances, the housing may include a slot at the first end and the lighting assembly may include a protrusion configured to be received within the slot. In some instances, the flange may include a compound surface configured to receive a joint compound. In some instances, the flange may include a compound ridge extending around an enclosed internal area of the flange. In some instances, at least one fastener may be configured to extend through the flange and the cover. In some instances, the vandal resistant light may further include a flange adhesive layer configured to adhesively couple the flange to the cover and a cover adhesive layer configured to adhesively couple the cover to the housing. In some instances, the flange adhesive layer and the cover adhesive layer may be volumetric adhesives. In some instances, the flange adhesive layer and the cover adhesive layer may be a double-sided acrylic foam tape. In some instances, the flange may be annular. In some instances, the flange may include one or more linear sides.

Another example of a vandal resistant light, consistent with the present disclosure, may include a housing having a first end and a second end, the first end opposite the second end, a lighting assembly disposed at the first end of the housing, the lighting assembly including a plurality of light emitting diodes, a heat sink, and an assembly cover, a housing cover disposed at the second end of the housing, the housing cover includes a continuous uninterrupted groove that extends around and encloses an exposed portion of the housing cover, and a flange including an extension configured to be at least partially received within the continuous uninterrupted groove.

In some instances, the housing may include a slot at the first end and the lighting assembly may include a protrusion configured to be received within the slot. In some instances, the flange may include a compound surface configured to receive a joint compound. In some instances, the flange may include a compound ridge extending around an enclosed internal area of the flange. In some instances, at least one fastener may be configured to extend through the flange and the housing cover. In some instances, the vandal resistant light may further include a flange adhesive layer configured to adhesively couple the flange to the housing cover and a cover adhesive layer configured to adhesively couple the housing cover to the housing. In some instances, the flange adhesive layer and the cover adhesive layer may be volumetric adhesives. In some instances, the flange adhesive layer and the cover adhesive layer may be a double-sided acrylic foam tape. In some instances, the flange may be annular. In some instances, the flange may include one or more linear sides.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A vandal resistant light comprising:

a housing having a first end and a second end, the first end opposite the second end;

a lighting assembly disposed at the first end of the housing;

a cover disposed at the second end of the housing, the cover includes a continuous uninterrupted groove that extends around and encloses an exposed portion of the cover; and a flange including an extension configured to be at least partially received within the continuous uninterrupted groove, wherein the flange includes a compound surface configured to receive a joint compound.

2. The vandal resistant light of claim 1, wherein the housing includes a slot at the first end and the lighting assembly includes a protrusion configured to be received within the slot.

3. The vandal resistant light of claim 1, wherein the flange includes a compound ridge extending around an enclosed internal area of the flange.

4. The vandal resistant light of claim 1, wherein at least one fastener is configured to extend through the flange and the cover.

5. The vandal resistant light of claim 1 further comprising a flange adhesive layer configured to adhesively couple the flange to the cover and a cover adhesive layer configured to adhesively couple the cover to the housing.

6. The vandal resistant light of claim 5, wherein the flange adhesive layer and the cover adhesive layer are volumetric adhesives.

7. The vandal resistant light of claim 6, wherein the flange adhesive layer and the cover adhesive layer are a double-sided acrylic foam tape.

8. The vandal resistant light of claim 1, wherein the flange is annular.

9. The vandal resistant light of claim 1, wherein the flange includes one or more linear sides.

10. A vandal resistant light comprising:

a housing having a first end and a second end, the first end opposite the second end;

a lighting assembly disposed at the first end of the housing, the lighting assembly including a plurality of light emitting diodes, a heat sink, and an assembly cover;

a housing cover disposed at the second end of the housing, the housing cover includes a continuous uninterrupted groove that extends around and encloses an exposed portion of the housing cover; and a flange including an extension configured to be at least partially received within the continuous uninterrupted groove, wherein at least one fastener is configured to extend through the flange and the housing cover.

11. The vandal resistant light of claim 10, wherein the housing includes a slot at the first end and the lighting assembly includes a protrusion configured to be received within the slot.

12. The vandal resistant light of claim 10, wherein the flange includes a compound surface configured to receive a joint compound.

13. The vandal resistant light of claim 12, wherein the flange includes a compound ridge extending around an enclosed internal area of the flange.

14. The vandal resistant light of claim 10 further comprising a flange adhesive layer configured to adhesively couple the flange to the housing cover and a cover adhesive layer configured to adhesively couple the housing cover to the housing.

15. The vandal resistant light of claim 14, wherein the flange adhesive layer and the cover adhesive layer are volumetric adhesives.

16. The vandal resistant light of claim 15, wherein the flange adhesive layer and the cover adhesive layer are a double-sided acrylic foam tape.

17. The vandal resistant light of claim 10, wherein the flange is annular.

18. The vandal resistant light of claim 10, wherein the flange includes one or more linear sides.

19. A vandal resistant light comprising:

a housing having a first end and a second end, the first end opposite the second end;

a lighting assembly disposed at the first end of the housing;

a cover disposed at the second end of the housing, the cover includes a continuous uninterrupted groove that extends around and encloses an exposed portion of the cover;

a flange including an extension configured to be at least partially received within the continuous uninterrupted groove; and a flange adhesive layer configured to adhesively couple the flange to the cover and a cover adhesive layer configured to adhesively couple the cover to the housing.

20. The vandal resistant light of claim 19, wherein the flange adhesive layer and the cover adhesive layer are a double-sided acrylic foam tape.

21. A vandal resistant light comprising:

a housing having a first end and a second end, the first end opposite the second end;

a lighting assembly disposed at the first end of the housing;

a cover disposed at the second end of the housing, the cover includes a continuous uninterrupted groove that extends around and encloses an exposed portion of the cover; and a flange including an extension configured to be at least partially received within the continuous uninterrupted groove, wherein the flange is annular.

22. A vandal resistant light comprising:

a housing having a first end and a second end, the first end opposite the second end;

a lighting assembly disposed at the first end of the housing;

a cover disposed at the second end of the housing, the cover includes a continuous uninterrupted groove that extends around and encloses an exposed portion of the cover; and a flange including an extension configured to be at least partially received within the continuous uninterrupted groove, wherein the flange includes one or more linear sides.

* * * * *